United States Patent
Robertson et al.

(10) Patent No.: US 6,507,410 B1
(45) Date of Patent: Jan. 14, 2003

(54) METHOD FOR NON-LINEAR DOCUMENT CONVERSION AND PRINTING

(75) Inventors: Philip Keith Robertson, Greenwich; John Charles Brook, Epping; Stephen Robert Bruce, Abbottsford, all of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/148,475

(22) Filed: Sep. 8, 1998

(30) Foreign Application Priority Data

Sep. 8, 1997 (AT) .............................. PO9045

(51) Int. Cl.[7] .............................. G06F 13/00
(52) U.S. Cl. .................... 358/1.18; 358/1.15; 707/513; 707/514
(58) Field of Search .............................. 358/1.9, 1.12, 358/1.13, 1.14, 1.15, 1.16, 1.17, 1.18; 707/512, 513, 514, 515

(56) References Cited

U.S. PATENT DOCUMENTS

| | | | |
|---|---|---|---|
| 5,048,869 A | 9/1991 | Schwartz | 281/16 |
| 5,210,622 A | 5/1993 | Kelley et al. | 358/451 |
| 5,316,341 A | 5/1994 | Schwartz | 281/15.1 |
| 5,337,161 A | 8/1994 | Hube | 358/448 |
| 5,380,043 A | 1/1995 | Schwartz | 281/15.1 |
| 5,492,315 A | 2/1996 | Maruyama et al. | 270/95 |
| 5,499,331 A | 3/1996 | Hayashi et al. | 395/148 |
| 5,519,501 A | 5/1996 | Hamilton | 358/295 |
| 5,600,771 A | 2/1997 | Hayashi et al. | 395/774 |
| 5,806,079 A | * 9/1998 | Rivette et al. | 707/512 |
| 5,857,211 A | * 1/1999 | Carper et al. | 707/515 |
| 6,052,693 A | * 4/2000 | Smith et al. | 707/104 |

FOREIGN PATENT DOCUMENTS

| | | | |
|---|---|---|---|
| EP | 0775962 A2 | 5/1997 | G06F/17/30 |
| WO | WO97/20274 | 6/1997 | G06F/15/02 |

OTHER PUBLICATIONS

"The SGML Handbook", Charles F. Goldfarb, 1990, Oxford University Press, ISBN 0–19–853737–9 (pertinent pages are set out in discussion herein relating to this document).

* cited by examiner

Primary Examiner—Mark Wallerson
(74) Attorney, Agent, or Firm—Fitzpatrick, Cella, Harper & Scinto

(57) ABSTRACT

A document creation system and method in which electronic information intended for reproduction and including at least one hyperlink is accessed. The accesses information is formatted into a contiguous localized document in a reproducible format into which is incorporated at least one functional link related to a hyperlink. The functional link is reproducible in a material form in the localized document for replicating a function associated with the hyperlinks. The localized document can then be displayed to reveal the function links which are manually traversable. Display is typically by printing and the functional links may include printed lines, cutouts in the paper or tabs applied to the paper.

60 Claims, 14 Drawing Sheets

```
<H1> This text contains a <BR>
<A HREF = "http://www.example.com/index.htm#end">link</A>
to another page.  </H1>
<P>Other content...
...
...
....
</P>
...
...

<A NAME = "end"> <H1> Heading Text </H1> </A>

<P> Other content ...
...
...
....
</P>
...
...
```

Fig. 4

Source HTML page or document

Reformatted page or document

```
<A NAME="end"><H1>Heading Text</H1></A>

<P>Other content...
...
...
...
</P>
...
...
```

Fig. 6

Reformatted page or document with various optional associations between visible and active portions of hyperlink.

METHOD FOR NON-LINEAR DOCUMENT CONVERSION AND PRINTING

FIELD OF THE INVENTION

The present invention relates to formation of a document from one or more sources of information and, in particular, to the reproduction, preferably by printing, of the document onto physical, human readable media in a manner so as to retain in the reproduction certain links or similar structures present in the sources.

BACKGROUND TO THE INVENTION

Techniques exist for the generating, formatting, displaying, saving or printing of structured documents, hierarchical documents, documents written in a markup language such as SGML, HTML or XML, and also for other forms of non-linear documents. Such techniques may provide formatted human-readable clear-text output or another alternative document format or presentation from that of the original document source-data. Typically however, any non-linear or structure information, or hyperlinking facility within the original document source data will be either lost, is ignored or rendered solely as textual information which is only passively informative to any reader.

One typical example of a source of tagged or hyperlinked non-linear documents is the so-called world-wide-web (WWW). A user may browse many disparate, but hyperlinked information sources in a non-linear manner on the web with the intent to access, create and print a personalized document containing or including one or more parts of one or more source documents encountered. Typically, the selection by the user of source documents or their partitioning, ultimately for assembly and printing as a single document, is strongly suggested by those tags or hyperlinks contained within the source document or documents. Typically, these tags or hyperlinks interconnect various parts of the source document, or parts of separate source documents with the interconnections being of various types including contextual, referential, informative, descriptive, elaborative, consequential or inconsequential and even linearly progressive.

Currently available arrangements permit a user to gather the document parts or documents' parts of interest and to assemble these into a whole, customized document which will be typically partitioned, cross-referenced or interconnected by the tags or hyperlinks which were distributed within the source documents. These original tags or hyperlinks, as selected by the user, will be the primary means of access and reference internally between sections of the newly customized document and typically, would have been the primary means of selecting or specifying the part or parts of the source documents for assembly of the final customized document. The implication is, therefore, that the user will wish to continue to refer to the tags or hyperlinks as an active and efficient, and perhaps as the sole, means of accessing or referencing the customized document, regardless of its final form, format or medium.

If the user wishes to print a typical customized document containing tags or hyperlinks assembled in the manner described above, then current arrangements permit textual printing of the hyperlinks within the document body, or as an appendix, footnote or similar. Such arrangements therefore cause the loss of the accessibility, active interconnection or referential properties of the hyperlinks through the process of printing the customized document. The user is thus forced to use some other method of accessing, indexing or referencing the contents of the customized document. Typically, the user is forced into a linear access method for the printed document, despite the original selection of the contents being made via a non-linear interconnection or hyperlinked method.

SUMMARY OF THE INVENTION

The present invention addresses the above deficiencies through preserving the interconnection and access properties of the original tags or hyperlinks once the customized document has been printed or otherwise reproduced, In accordance with one aspect of the present invention there is disclosed a method of creating a representation of information from at least one electronically accessible source of said information, said information including at least one referential link between first matter in said information and second matter in said information, said method comprising the steps of:

electronically extracting said information from said at least one source;

identifying said referential link to establish a referential path between the first matter and the second matter;

arranging the information as a document in a format suitable for hard copy reproduction in which each of said first matter and said second matter are individually identifiable, and using said referential path to incorporate into said document and format a user interpretable functional link between the first matter and the second matter.

In accordance with another aspect of the present invention there is disclosed a displayable document comprising information for hard copy reproduction, said information including a identifiable first link between first matter within said document and second matter within said document, characterised by a functional second link referring from the first matter to the second matter, said functional second link being formed using a association between the first matter and the second matter reproduced in a user interpretable manner in said document.

In accordance with another aspect of the present invention there is disclosed a document creation system including:

means for accessing electronic information intended for reproduction, the information including at least one hyperlink, means for formating the accessed information as a contiguous localized document in a reproducible format;

means for incorporating into said localized document at least one functional links related to said at least one hyperlink, said at least one functional links being reproducible in said localized document for replicating a function associated with said at least one hyperlink; and means for displaying the localized document.

In accordance with another aspect of the present invention there is disclosed a non-linear access method for a hard copy document, said document comprising linearly arranged information and at least one link physically incorporated in said document and coupling first matter in said information with second matter, said method comprising the steps of:

observing a reproduction of said first matter in said information distinguishable from other of said information; and tracing a physical indicia in said document distinguishable from said information from said first matter to identify said second matter.

In accordance with another aspect of the present invention there is disclosed a computer program product comprising a computer readable medium incorporating a series of instructions interpretable by a computer for creating a document, said computer program product including:

a first module for accessing electronic information intended for reproduction, the information including at least one hyperlink;

a second module for formatting the accessed information as a contiguous localized document in a reproducible format;

a third module for incorporating into said localized document at least one functional link related to said at least one hyperlink, said at least one functional link being reproducible in said localized document for replicating a function associated with said at least one hyperlink; and a fourth module for displaying the localized document.

In accordance with another aspect of the present invention there is disclosed a computer system comprising:

input apparatus for interfacing user commands to said system:

a processor device couplable to a computer network from which a plurality of electronic documents are accessible, said documents including one or more hyperlinks, said processor device being configured to operate a computer program in response to said user commands to access selected ones of said documents intended for reproduction, and to format the accessed documents as a contiguous localized document in a hard copy reproducible format, said formatting including incorporating into said localized document functional links related to said hyperlinks, said functional links being reproducible in a material form in said localized document for replicating functions associated with said hyperlinks; and a printing device for reproducing said localized document by printing onto a recording medium, said printing device being associated with a further device for forming with said recording medium indicia corresponding to said functional links whereby said indicia are manually accessible using a hard copy reproduction of said localised document to traverse said reproduction in a manner complementing said electronic documents.

BRIEF DESCRIPTION OF THE DRAWINGS

A number of preferred embodiments of the present invention will now be described with reference to the drawings in which:

FIG. 4 indicates syntax used for hyperlink implementation;

FIG. 6 is an example of a hyperlink syntax;

DETAILED DESCRIPTION

Figure 11A:
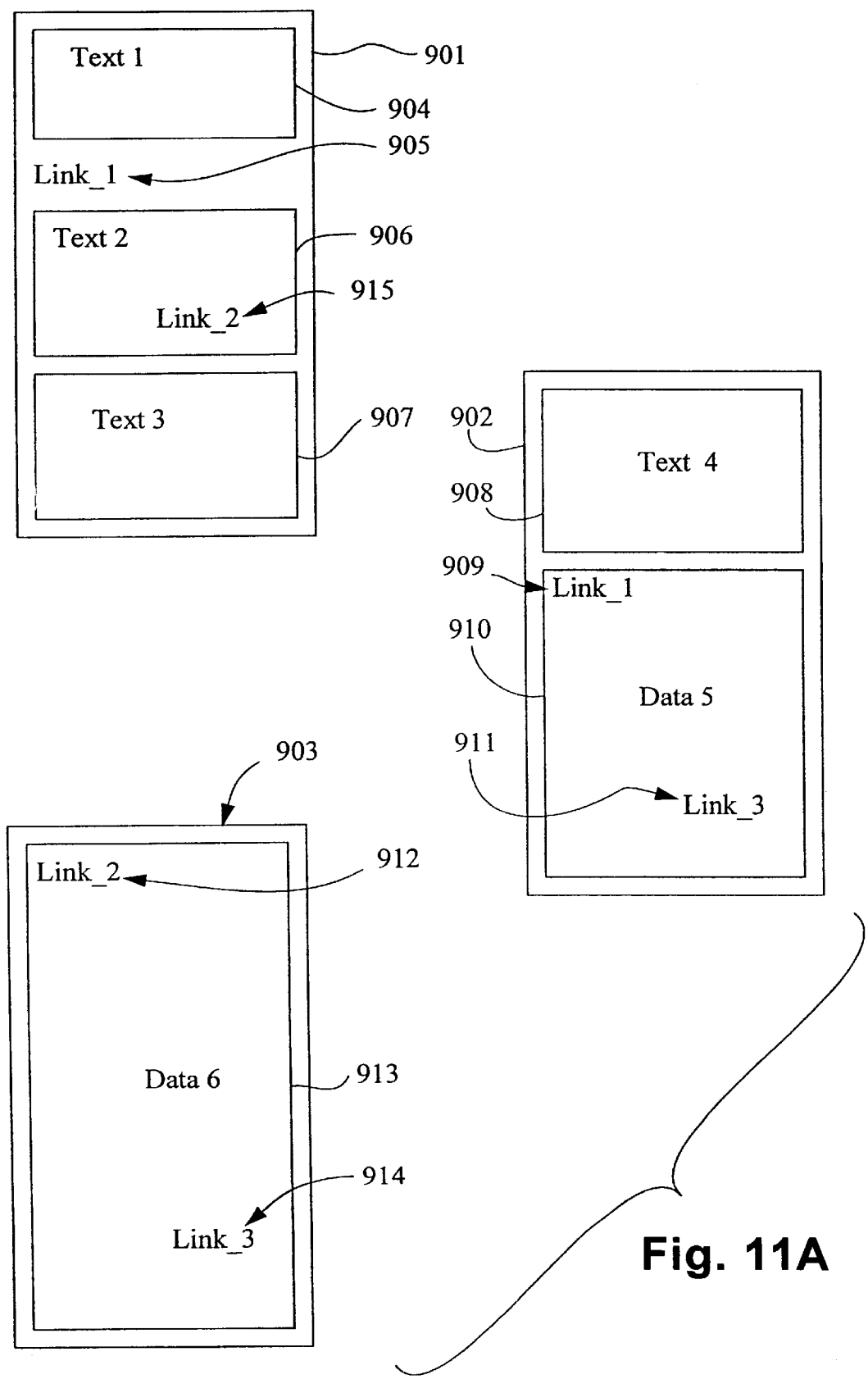
FIGS. 11A to 11C illustrate the formation of a displayable document according to a simple embodiment.

FIG. 11A schematically illustrates three source documents 901, 902 and 903 which may typically be accessed via the World-Wide-Web either directly or indirectly. For example as seen, the first source 901 includes a first text portion 904 which is followed by a hyperlink 905 which, in this example, represents a heading to a second portion of text 906. As seen, the text 906 includes an embedded hyperlink 915. The source document 901 ends with a third portion of text 907.

Hyperlink 905 links the source document 901 with the source document 902 which is seen to commence with a text portion 908 followed by a link destination 909 corresponding to the location called by the hyperlink 905. For example, the destination link 909 can be a header to a data portion 910 which may include an image related to the text 906 recited beneath the calling hyperlink 905. In this manner, as will be understood by those familiar with the World-Wide-Web, selecting the hyperlink 905 will automatically cause a traversal of the Web to the link destination 909. As seen in FIG. 11A, the data portion 910 includes an embedded hyperlink 911 which, together with the hyperlink 915, provide a source of access to the third document 903. As seen. the hyperlink 915 accesses a link destination 912 which acts as a header for a data portion 913 which includes a destination link 914 corresponding to the hyperlink 911.

Whilst electronically traversing the World-Wide-Web, hyperlinks permit the user to be immediately transported from one part of the Web to another where appropriate to access the referenced information. However, when hypertext linked documents are extracted from the Web and stored as linear documents within a local computer, such as documents intended for printing or as other forms that do not support hyperlinks (eg. text only data), or when printed in hard copy form. the electronic traversal function afforded by the hyperlinks is lost.

Figure 11B:
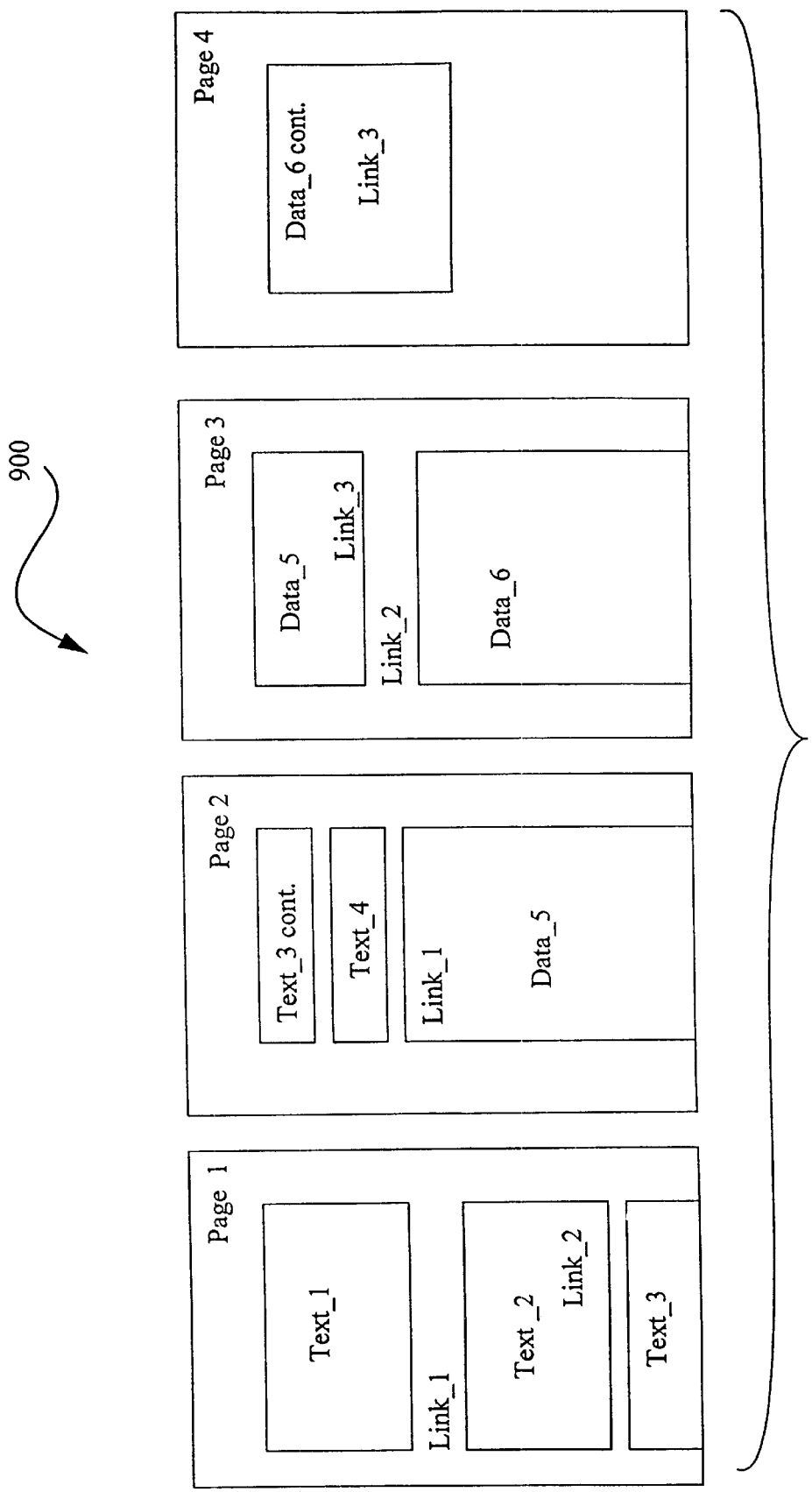

According to the specific embodiment, where it is desired to create a local document based upon the sources 901, 902 and 903, a linear document 900 is created which is shown in FIG. 11B and formatted into a form ready for display using a printer hard copy output device. As seen in FIG. 11B, in order to obtain appropriate pagination, in this example, the three source documents 901–903 are spread over four display pages. Further, and where appropriate, the various blocks of text and the like are reformatted so as to best occupy the space available on each of the display pages. At this stage, because each of the hyperlinked referenced documents 901–903 are all formed within a contiguous single document 900, the benefits of the non-linear hyperlinking obtained from the World-Wide-Web are lost.

Figure 11C:
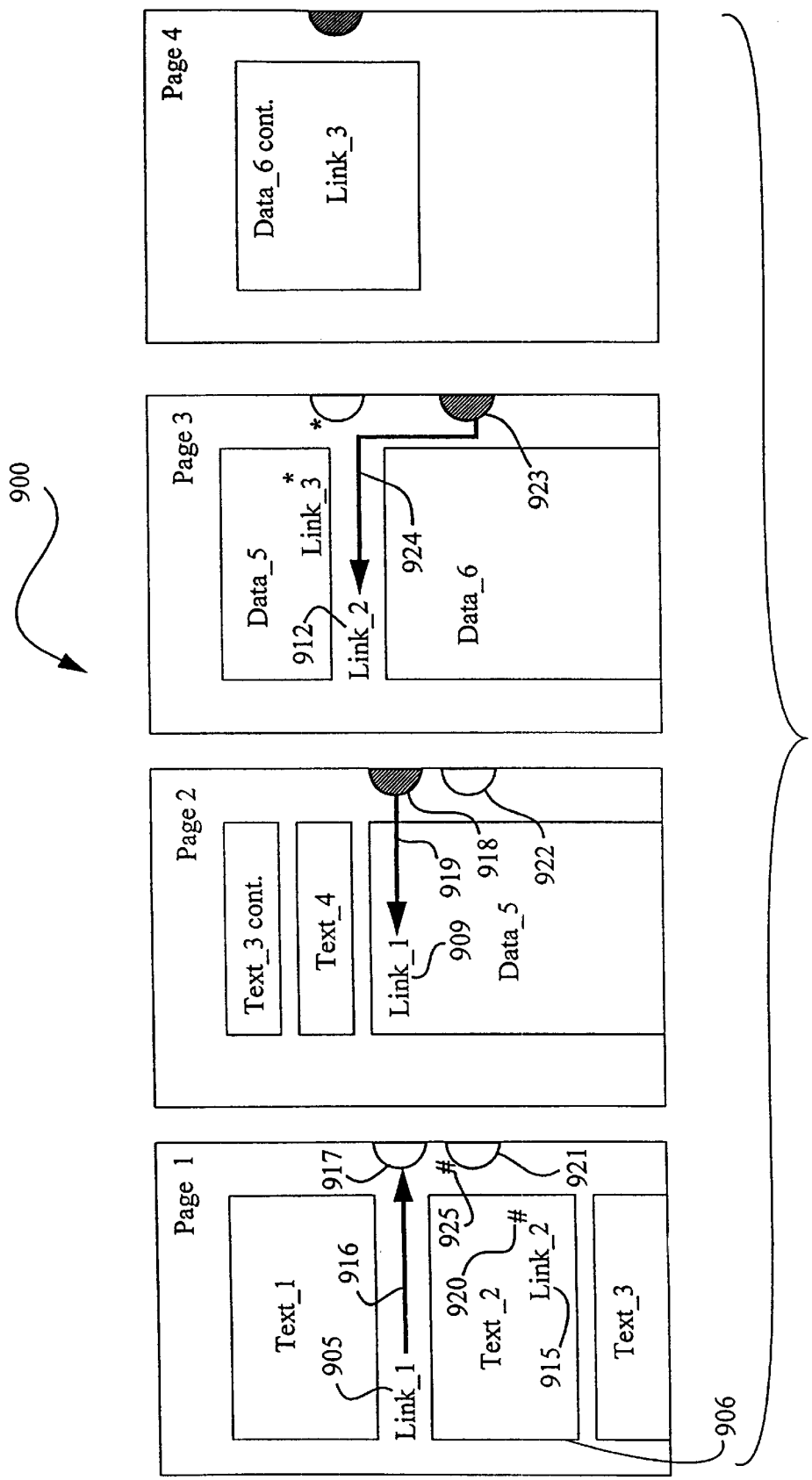

According to this particular example, and as shown in FIG. 11C, the document 900 is modified whereby each of the hyperlinks 905, 915 and 919 and their associated linked destinations 909, 912 and 914 are functionally provided by altering the document of FIG. 11B to provide a functional relationship between the various parts of the document 900 in the form in which it is to be displayed by printing. As seen in FIG. 11C, the heading associated with the original hyperlink 905 is supplemented by a functional link comprising a line 916 displayed on the document and interconnecting the heading/link 905 with a cutout portion 917 arranged on the edge of the page. The cutout portion, by virtue of being on page 1 of the document 900 and overlying page 2, overlies and exposes a colour marked portion 918 on page 2 which, via a rendered line 919 provides a functional link to a heading corresponding to the hyperlink destination 909 seen in FIG. 11A. In this manner the functionality of the original hyperlink found on the Web is maintained in the document 900 through providing a user thereof with a ready means of traversing the document 900 between appropriately linked portions thereof.

Where the display document of FIG. 11C is printed in hard copy form, the cutout portion 917 can be physically cut from the paper of the document thereby providing a direct page access functional reference between the link 905 on page 1 and its destination 909 on page 2.

As further seen in FIG. 11C, the link 915 is embedded within the second portion of text 906 and such positioning is not conducive to the use of a line, corresponding for example to the line 916, to link with an appropriate cutout portion. In this case, the graphic identifier 920 is associated with the hyperlink 915 and refers to an associated cutout portion 921 which is provided with the same graphic symbol 925. As seen, the cutout portion 921 overlies an unreferenced cutout portion 922 on page 2 and a corresponding shaded portion 923 on page 3 which connects, via an indicator line 924 to the destination hyperlink 912. In this manner, the arrangement of functional links within the display document of FIG. 11C can be provided in such a manner so as not to impact upon the readability of the document yet afford the ability to traverse the display document 900 in a manner corresponding to that which would be available using the electronic hyperlinks sourced from the World-Wide-Web.

As indicated above, where the display document 900 of FIG. 11C is printed on hard copy form, the cutouts are physically cut out from the edge of the medium (paper) Further, tabs that protrude from the edge of the medium may be used as an alternative or in addition to the cutouts.

From the simple example of FIGS. 11A, 11B and 11C, it will be apparent that the present invention provides for maintaining non-linear hyperlinks extracted from the World-Wide-Web in linear, local display documents intended for hard copy reproduction. The hyperlinks remain in a functional manner and maintain the linking between various pages or components of the document. In a preferred implementation, the display document 900 can be configured for reproduction upon a video display as a video simulation of the hard copy document and in such an application, the cutouts or tabs may be formed as user selectable icons which reproduce, in the local computing environment, the same effect as that available on the World-Wide-Web and that available using the hard copy document.

Figure 1:
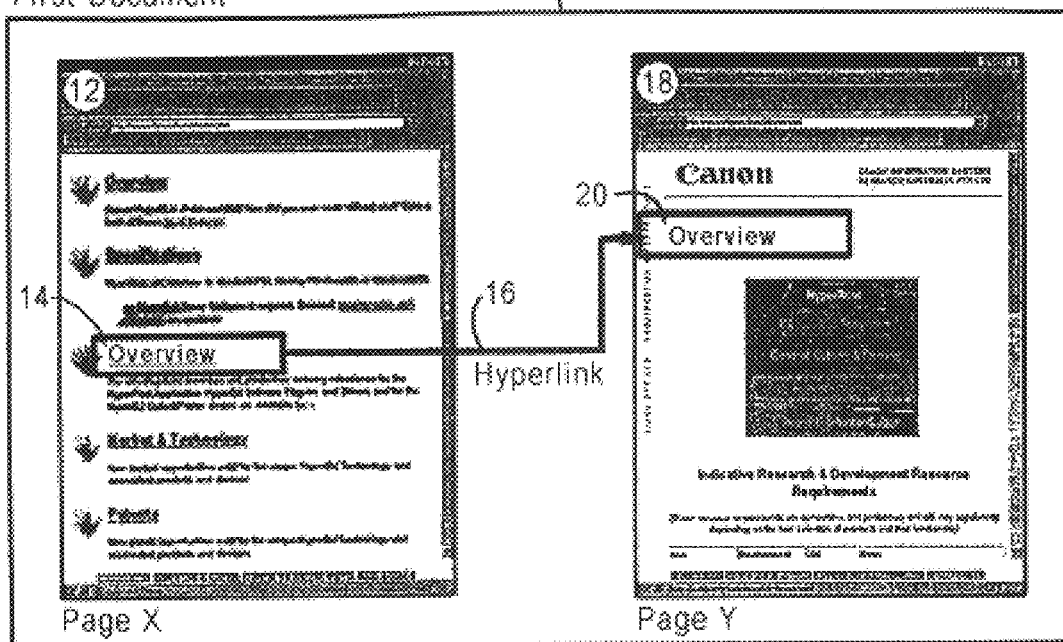
FIG. 1 illustrates the conversion of a first (source) document into a second printable document according to the preferred embodiment.
Figure 1:
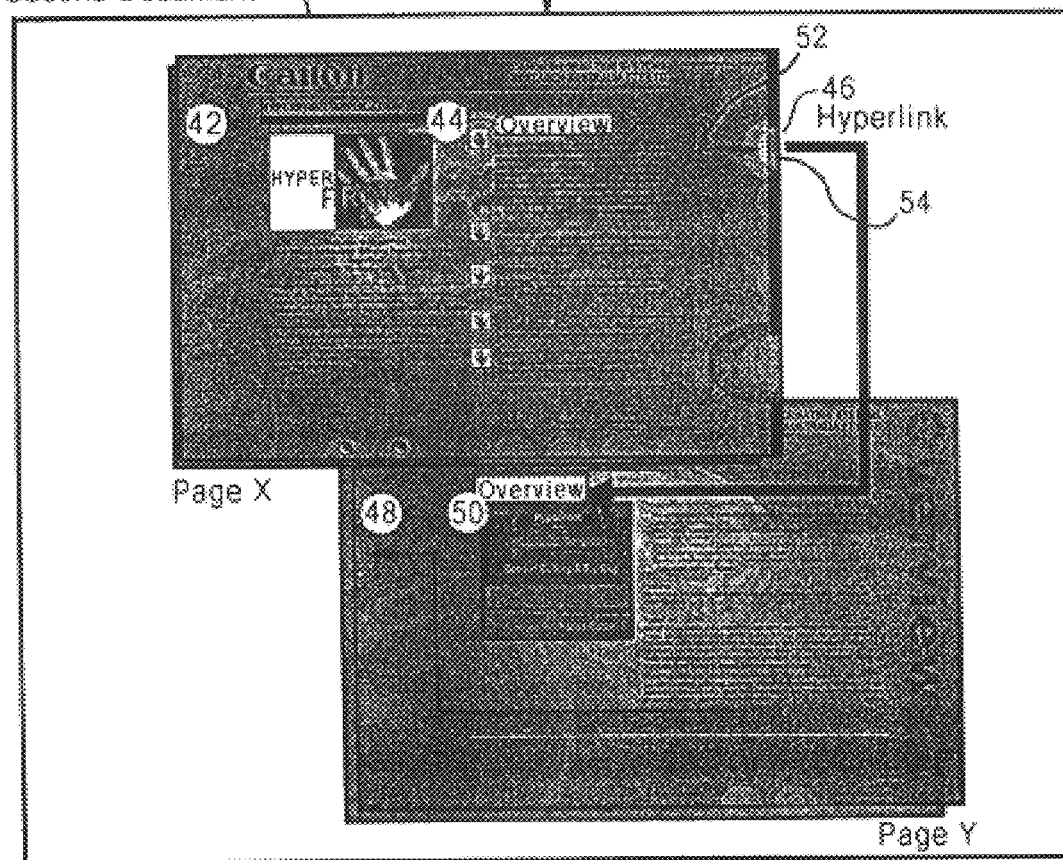

FIG. 1 shows an example first document 10 which includes one or more pages or sections 12 and 18, both of which may be described by a markup language or languages such as HTML or XML or the like. The first document 10 will typically be accessed by browsing on the world-wide-web or some other similar information source. The first document 10 generally contains one or more "typical" pages, for example the page 12, referred to herein as First Document Page X, to indicate that there is no specific or ordinal reference or location for First Document Page X 12, within the first document 10. Particularly there is no specific or relative position nor ordinality of the page 12 with reference to any other page or pages, for example represented herein by First Document Page Y 18, also contained within the aforesaid first document 10. Similarly the First Document Page Y 18 also has no specific or ordinal reference or location within the first document 10.

The First Document Page X 12, includes a hyperlink 14 or similar feature of equivalent functionality and accessibility, represented visibly or by other means suitable for detection by human senses. The hyperlink 14 provides an interconnection, reference and/or access 16, to the First Document Page Y 18, or to some part 20 of the First Document Page Y 18. The part 20 can, for example be a section, graphic or a textual element, to name but a few. The hyperlink 14 may reference the First Document Page Y 18, via any positive or negative ordinal, relative or absolute path that is necessary or optional to implement the hyperlink interconnection 16 within the first document 10. Such an arrangement provides a location-to-location linking between sources of information. Alternatively, a content-to-content linking of the sources of information may be implemented.

Prior art arrangements, such as those discussed above, when printing the first document 10, whilst being able to visually represent the hyperlink 14, for example by reproducing the text thereof as a footer or contents listing, are unable to reproduce the functional and referential properties of the link 16 between the two pages 12 and 18.

The preferred embodiment provides a method associated with the processing and printing or rendering of the first document 10, to produce a physical copy or representation 40, including the First Document Page X 12 and First Document Page Y 18, and also including visible representation of hyperlinks 14, within the First Document Page X. Further, the actual hyperlink reference 16, as distinct from the visible representation 14 of the same hyperlink, is retained within the printed copy 40. as a functional and accessible feature 46, of the printed copy 40 of the first document 10. As seen in FIG. 1, the printed document 40 contains printed copies or representations of the component parts of first document 10, with the Second Document Page X 42 representing a printed copy of the First Document Page X 12, and the Second Document Page Y 48, representing a printed copy of the First Document Page Y 18. FIG. 1 also shows an example of a printed representation 44 of the visible representation 14 of the hyperlink 16. In this embodiment, the visual representation 44 of the hyperlink is associated with a functional reference 46 to the actually referenced part 50 which in this case appears on a separate page 48 of the second document 40. As illustrated in FIG. 1, the functional reference 46 includes a printed line 52 extending from the visual representation to a page finger tab (cut-out) 54 which directly references, through manual operation of the second document 40, the page Y 48 on which the actually referenced part 50 is found.

Clarification may be required of the distinction between the visible representation 44 of a hyperlink and the functional/virtual/physical activation 46, of the same hyperlink. A hyperlink may be displayed, rendered or printed purely as a textual or graphical element, in which case only the visible portion 44, of the hyperlink exists in the printed document 40. Such a hyperlink will be non-functional and will normally only have the same attributes as other text in the same document or page as found in the prior art. Alternatively, in the preferred embodiment it is normally intended for a hyperlink in a world-wide-web HTML page 10, or equivalent, to also have a functional property 16, associated with its visible property 14. In the environment of an HTML web page 10, or equivalent, the functional property 16 is available within a web browser window and typically permits a user to traverse within or between hyperlinked pages or documents. Prior art arrangements do not provide for the retention of this hyperlink functional property 16, once an HTML page is printed or rendered to a physical medium. In FIG. 1, the hyperlink property 46 in the printed document 40, is typically inactivated or lost when original hyperlink 16 in Web page document 10 is processed or printed by prior art methods. In such a case, only the visible property 44 of the hyperlink is preserved or copied from the original visible property 14 (if at all).

Figure 10:
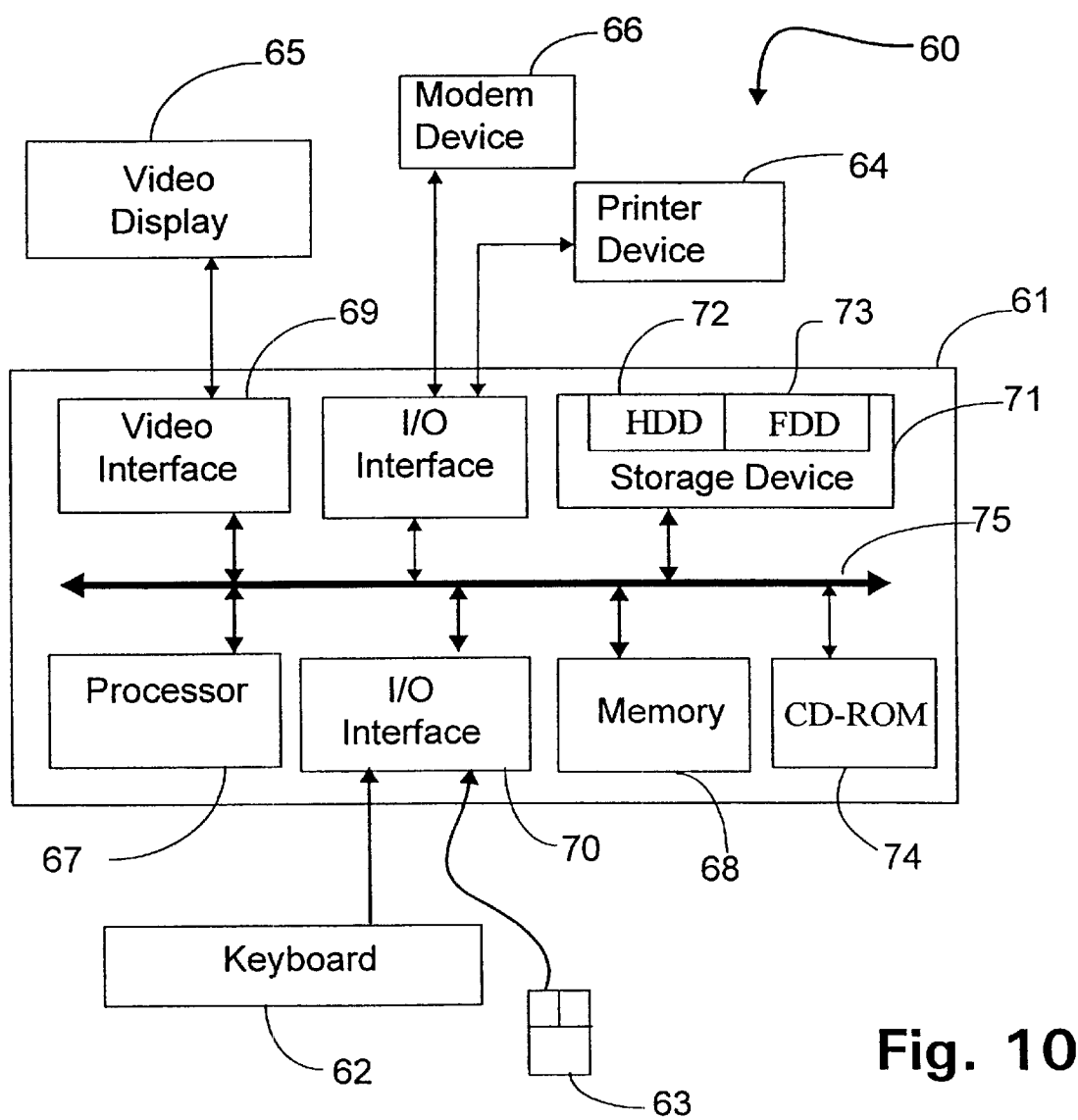
FIG. 10 is a schematic block diagram representation of a computer system in which the embodiments may be implemented.

Whilst the above refers primarily to documents sourced from the WWW, other documents may be used as appropriate sources of information. These include, but are not limited to, user or self generated documents that contain referential links, and also existing documents where referential links are added by the user. A further class of documents include those in the process of creation, as will become apparent in the following description The described embodiments of the present invention may be practiced using a conventional general-purpose (host) computer system, such as the computer system 60 shown in FIG. 10, wherein an application program developed to produce the results shown in FIG. 1 discussed above and to be described with reference to the other drawings is implemented as software executed on the computer system 60. The computer system 60 includes a computer module 61, input devices such as a keyboard 62 and mouse 63, output devices including a printer 64 and a display device 65. A Modulator-Demodulator (Modem) transceiver device 66 is used by the computer module 61 for communicating to and from a computer network, -and is for example connectable via a telephone line or other functional medium. The modem 66 can be used to obtain access to the Internet, and other network systems, including the World Wide Web.

The computer module 61 typically includes at least one processor unit 67, a memory unit 68, for example formed from semiconductor random access memory (RAM) and read only memory (ROM), input/output (110) interfaces including a video interface 69, and an I/O interface 70 for the keyboard 62 and mouse 63. A storage device 71 is provided and typically includes a hard disk drive 72 and a floppy disk drive 73. A CD-ROM drive 74 is typically provided as a non-volatile source of data. The components 67 to 74 of the computer module 61, typically communicate via an interconnected bus 75 and in a manner which results in a conventional mode of operation of the computer system 60 known to those in the relevant art. Examples of computers on which the embodiments can be practiced include IBM-PC/ATs and compatibles, Sun Sparcstations or alike computer systems. Typically, the application program of the preferred embodiment is resident on thea hard disk drive 72 and read and controlled using the processor 67. Intermediate storage of the program and display data and any data fetched from the network may be accomplished using the semiconductor memory 68, possibly in concert with the hard disk drive 72. In some instances, the application program, which incorporates the present invention, may be supplied to the user as a physical product, for example encoded on a CD-ROM or floppy disk, or alternatively could be supplied to the user as a virtual product, for example through the user reading the program from the network via the modem device 66. The application program, whether sourced from a disk device such as CD-ROM or floppy disk, from the computer network, or some other arrangement (eg. tape drive, PCMCIA card, DVD etc) is typically retained in the hard disk drive 72 and executed in or with the aid of the RAM 68. Alternatively, or additionally, the application program may be incorporated into a printer and/or cutter device, although such implementation may impact upon the full extent of user functionality to be described.

In the preferred embodiments, the printer 64 is of a type configured not only to print an image upon a medium, but also to create finger cut-outs of the type seen in FIG. 1. An alternative printer is one that is able to apply a tab to a printed page or other physical feature that may operate as a functional link for predetermined referential links. Alternatively, the referential markers (cutouts, tabs, etc) may be applied by separate printing and cutting devices controlled by the computer. Further, the referential links may be marked on a printed page by a printer and referential markers (cutouts, tabs, etc.) applied manually to pages so marked.

A physical document produced according to the present invention may be formed in a number of ways, a first of which involves reproducing the printed matter physical hyperlinks essentially simultaneously using a unitary printer/cutting-type device. An example of such a device is the Fargo Impressa Die Sublimation Resin-Wax Thermal Label Printer manufactured by Fargo Electronics Inc., of the USA.

An other way of producing such a document is to first print the document, which can be achieved using any one of a plethora of printing systems known to those in the art. The printed pages can then be cut using a controllable cutting device to produce the physical hyperlinks such as the tabs and cut-outs. An example of such a cutting device is the FC3100-60 Desktop Grit-Rolling Cutting Plotter manufactured by Graphtec Technologies of Florida, USA. This device utilizes computer controlled knives to cut the printed medium (eg. paper) and operates in a manner akin to plotter-printing devices, known to those skilled in the printing arts. Other cutting mechanisms may also be used. For example, punching finds ready application in situations where many pages require corresponding cut-outs to be formed, for example in the creation of finger tabs.

A still further way of producing such a physical document is to first cut the medium (eg. paper sheets) in the required manner to produce the physical hyperlinks, and then print onto the medium the required text and other information including printed hyperlinks. Such an approach is however unlikely to be preferred as, in general, printing systems operate most efficiently when handling uniformly shaped and/or sized material.

A future way of producing the physical document is to generate the document electronically, and retain the same on a recording medium, the medium then being supplied to a printer/cutter system for physical reproduction of the document retained on the medium.

In detail, the first document 10 seen in FIG. 1 typically comprises at least one HTML Web page or similar or equivalent. For the purposes of the explanation, the first document 10 will be described as containing two Web pages 12 and 18, linked by a typical hyperlink 16. These two pages 12 and 18 may be interspersed amongst other pages, need have no linear connection or commonality (such as page numbering), and may be in any order (if indeed the term 'order' is applicable to the storage or referencing method for first document 10). Indeed, the two web pages 12 and 18, may be from separate original web documents, or may in fact be separated by any physical or virtual or Internet distance. Therefore, the first document 10 may be a virtual document, inasmuch as it may contain or include web pages which are from separate or disparate sources and the definition of the contents of the first document 10, may be purely a user definition, being possibly temporary, transitory, or ephemeral, for instance, merely existing in the mind of the user or in some construct relating to the operation of a user's web browser or similar application.

Document 10, whether it be originally constructed or intended to include or reference or hyperlink to pages 12 and 18, would typically include hyperlinks interconnecting most or all pages, as this is the typical method of referral between web pages. This typical interconnecting or hyperlinking between pages, whatever their origin, to form a virtual document (or documents) is a common method of obtaining information from the World-Wide-Web and forms the typical starting point for the described embodiment. However, any hyperlinking method within the first document 10 may be used.

The preferred embodiment allows the user to control, either manually, or by some automatic method, to select and store web pages from the Internet or World-Wide-Web to form a first document 10, which is further processed and finally printed and cut to produce a second document 40, which is in physical form. The second document 40 will typically contain the same content as contained within first document 10 with similar, parallel, analogous or identical hyperlinking connections between content or pages of the document 40, as were originally present in document 10. Indeed, it is desirable to provide as much similarity, parallelism, analogy or identity between the hyperlinking methods of both forms of the document 10 and 40, however, the method of the invention may permit the user to modify the document 40 to contain changes to the hyperlinking connections from those included in first document 10, In addition, it is desirable to accommodate and comply with the constraints of the output or printing medium in production of the document 40, in which case identical implementations or arrangements of content and hyperlinking may not be possible between documents 10 and 40 and the invention will attempt to find and implement or offer the user a suitable alternative or compromise arrangement of content or implementation of hyperlinking.

The first document 10 includes a page 12, which contains a hyperlink 16, pointing to some content 20, on page 18. The direction, numerical page increment or decrement, or address details of the hyperlink 16, are unimportant. The preferred embodiment records the document and page positions of the hyperlink start point 14, and end point 20, and any content-relevant details including which element or elements the hyperlink attaches to, how it is positioned within the page or pages relative to adjacent elements, etc. The hyperlink 16 typically includes several attributes, including a starting point 14, normally defined as being connected to a content element such as text or an image or graphic. The hyperlink starting point 14, also represents the visible attribute of the hyperlink, which need not be present, but is typically present to indicate (eg. visually) the availability of the hyperlink to a user. A typical method of operating a hyperlink is to select, click or otherwise activate the visible attribute, 14, which operation indicates to a user's browser software to analyse the attributes of the hyperlink to find the end point address or reference 20 within those attributes and to traverse the contents of the first document 10 directly to the indicated end point address 20, typically without considering or displaying any other content which may exist between the start point 14 and the end point 20. One example of a hyperlink syntax is indicated in FIG. 4, in which the hyperlink attributes are defined and enclosed within the markers "<A" and "</A>". For the purposes of this description, the hyperlink 16, includes its attribute information, such as start point 14, and end point 20, but excludes its visible attribute or appearance which is indicated by the text seen at 14 in FIG. 1. The hyperlink 16 is also used to refer to the action of traversing the document 10 from start point 14 to end point 20.

Figure 2:
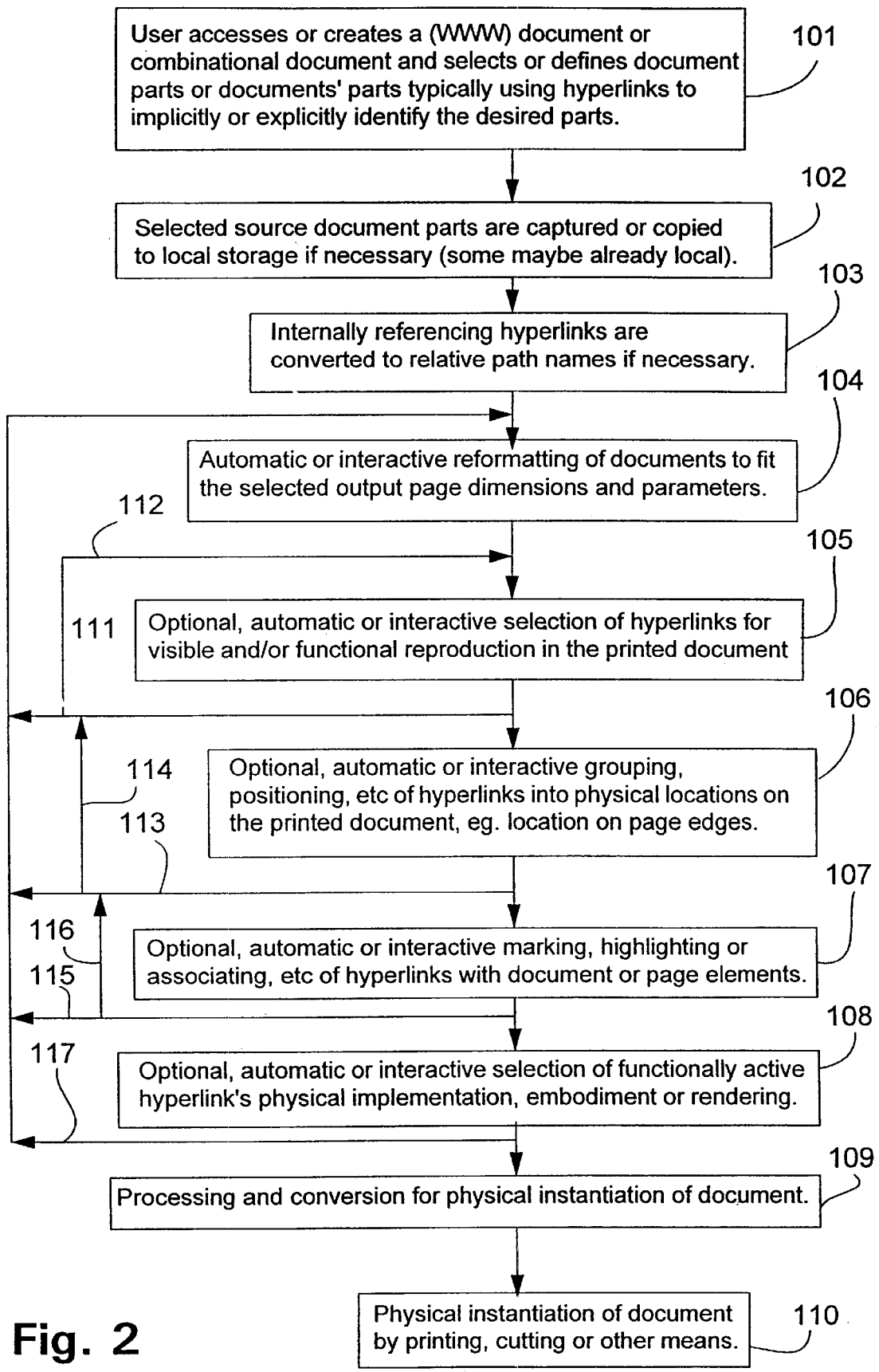
FIG. 2 is a flow chart representing the method implemented by the preferred embodiment.

Referring to FIGS. 1 and 2, after the first document 10 is created, defined or stored in memory as indicated as step 101 in FIG. 2, the document contents are copied and stored within local memory or storage, as indicated by step 102. Next, if required, in step 103 hyperlink attributes which involve absolute pathnames, or those attributes containing references to the original external first document 10, are converted to internal and/or relative references or pathnames so that the local or internal copy of the first document 10 contains self-consistent hyperlinks which refer, as much as possible, only to the internal or local first document 10 and not to the original, external first document 10.

Figure 3:
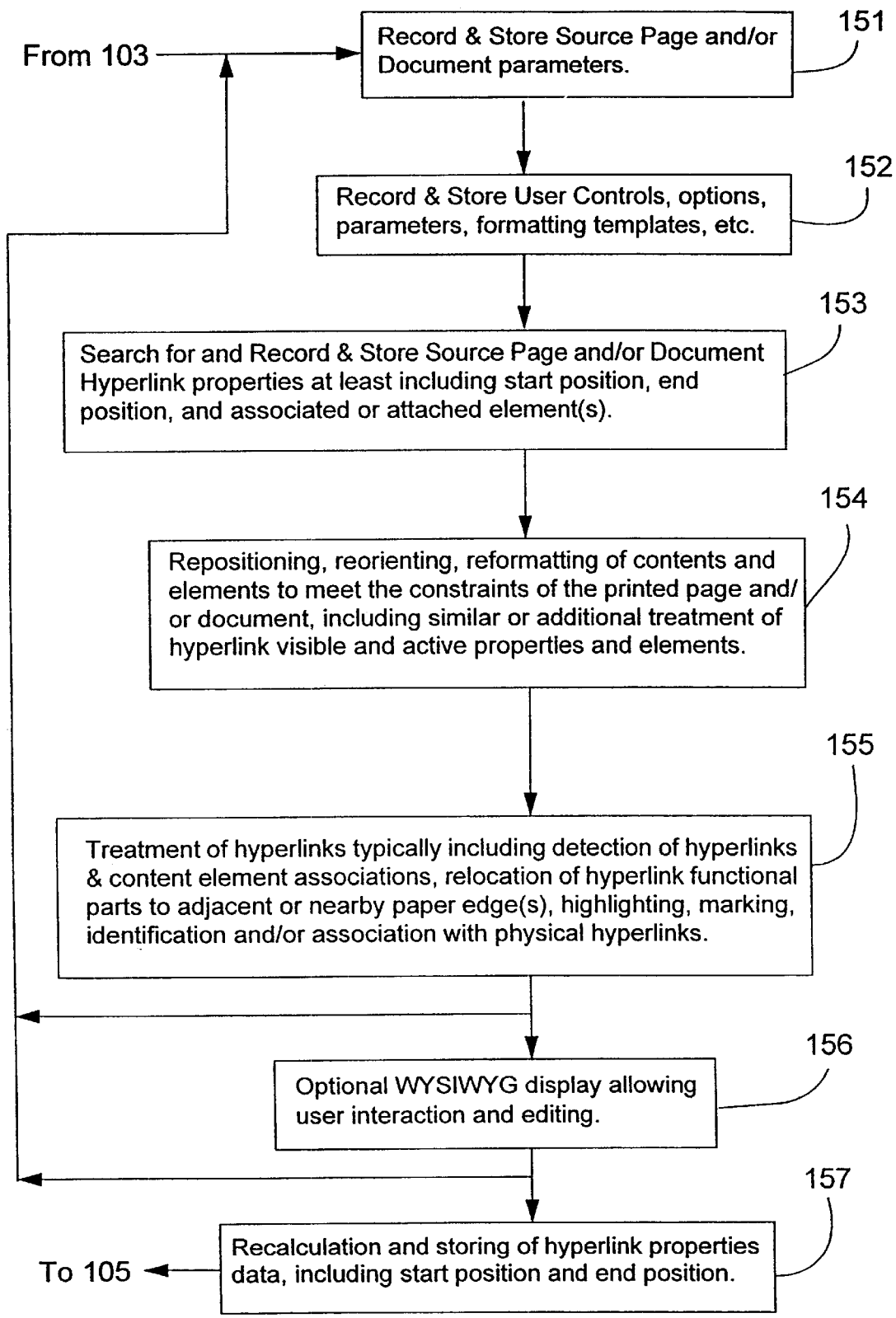
FIG. 3 is a flow chart detailing step 104 of FIG. 2.

Next, at step 104, the internal copy of the first document 10, is processed, typically including reformatting of pages and document elements and content, to satisfy various constraints, options or parameters imposed upon the process. The major purpose of step 104 is to reformat the document to meet the constraints of the final medium, for instance, printed, cut and bound paper sheets in book or booklet form. It is typically the case that the content and page layout of an HTML web page first document 10, is unsuitable for or incompatible with direct printing to paper. Therefore, reformatting may be required. Step 104 typically comprises several operations which may involve iteration or interaction and these are indicated in FIG. 3.

Step 104 includes the step 151 of recording and storing the parameters of first document 10, including document and page layout and formatting parameters and properties, such as page orientation, page size, quantity of pages, font sizes and properties, together with information regarding the element positions and dimensions and other properties, relative placement of elements and spatial (eg. z-axis) or overlay, relationships of elements. Next, user options and controls, including any selected control and/or reformatting template, are recorded and stored in step 152. Step 153 follows in which hyperlink attributes, start and end points, spatial and visible relationships or attachments with other document elements and any other relevant properties or parameters are recorded and stored for first document 10. This operation may be performed by searching the first document 10, for syntactical elements or semantic relationships as defined in or allowed by the applicable HTML standard or standards, where the syntactical elements or semantic relationships indicate or declare hyperlinks or related attributes within the first document 10. Steps 151, 152 and 153 may be operated in any particular order or combination that is practical.

Step 154 follows step 153 and includes the reformatting of the first document 10, into a format or layout more suitable to meeting the various constraints for printing and also in obedience to the controls, parameters, constraints, properties or templates recorded or selected and stored in steps 151, 152 and 153. Various operations may be undertaken to effect the reformatting of the document, including repositioning of elements or pages, page-splitting or merging, reorienting of elements or pages, alteration of spatial relationships of document parts, pages or elements, modification of font properties and visible attributes of elements, such as highlighting, etc to better suit the conventions or physical properties of the intended medium, or to meet the constraints or requirements selected or defined in steps 151, 152 and 153. Typically, it will be necessary to reformat the first document 10, into a linear sequence of pages 40, since such linearity is typically enforced by the physical nature of the printed medium. Such a structural modification of a typically non-linear document 10, to a linear format in document 40, will typically have a significant impact on the arrangement and layout of pages and of page content. It will typically be the case that special processing of the document content and format may be necessary to retain or to partially retain an analogy, parallelism or identity between the structure and layout of first document 10, and the structure and layout of second document 40. In addition to such reformatting operations, it is typical that hyperlinks in the original document 10 may have their visible attributes modified to meet the constraints of the new medium used for physical document 40, or to satisfy the requirements of the selections or controls input in steps 151, 152 and 153. In addition to any minimum required or recommended modifications to hyperlinks' attributes in original document 10, suitable for inclusion or reproduction in physical document 40, there may be further attribute modifications which are automatically performed or recommended to the user, possibly including standard alterations to hyperlinks' visible attributes. For instance, highlighting in colour, or underlining or other hyperlink attribute treatments, which may be optionally replaced or further enhanced by any relevant input controls, constraints, options or selections recorded in steps 151, 152, 153. It is possible that such treatment of hyperlink visible attributes may be controlled or influenced by a template or a template property, properties, parameter or parameters, any or all of which may be selected by the user.

Further to the treatment of hyperlinks in step 154, step 155 which follows may include the treatment of hyperlinks relating to the specific relationship of the hyperlink to surrounding or adjacent content or the further treatment may relate to any presentation control, constraints, parameters or properties be they specific or default, associated with the content, the web page, the document, or referred to by the latter. An example of such presentation control is the Cascading Style Sheet method. This method allows an HTML web page to refer to, or associate, a Style Sheet with the HTML content, including association with hyperlinks, to control or modify or enhance the presentation of the document 10, or the document 40 and its contents, optionally with treatment specifically for the intended presentation medium. In addition to this possible treatment of document content and specifically to the treatment of hyperlink attributes, the treatment of hyperlink attributes, either replacing, modifying or enhancing any foregoing treatment, so as to provide improved placement, or highlighting, emphasis or legibility of hyperlinks within the format and constraints of the destination medium, typically a printed, cut and bound collection of paper sheets 40 can be implemented.

Further treatment of hyperlinks for a printed and cut HTML document 40, or for a printed, cut and bound HTML document 40 can be provided through additional processing, formatting, highlighting, and other treatment of hyperlinks than are available. These additional processing and treatments of hyperlinks in step 155 can be varied under user or automatic control, and may depend on aforementioned constraints such as the dimensions and other properties of the destination printed document 40 and its format, but are generally intended to include rearrangement of hyperlink-associated content elements, such as text, images or graphics to better position hyperlinks closer to page edges for later cutting of tabs or access holes, or positioning for better highlighting by addition of a graphic element or colour or other highlight effect or possibly combinations of the aforementioned treatments.

Figure 7A:
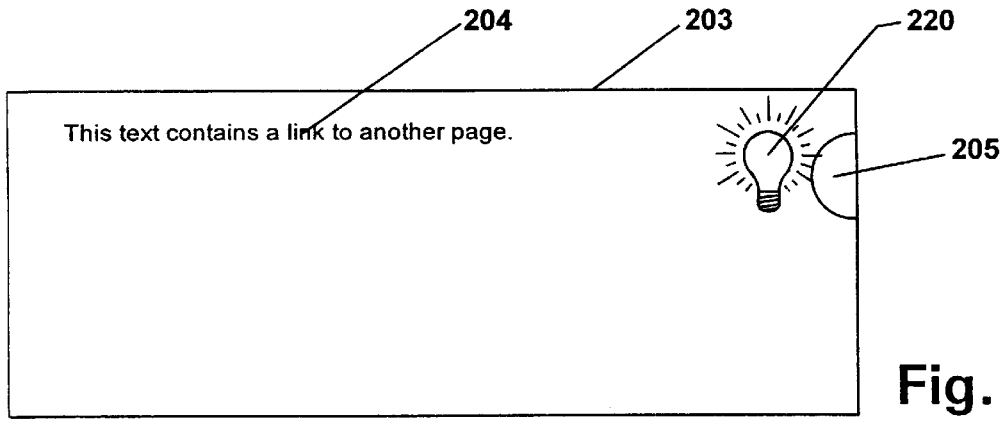
FIGS. 7A–7C show examples of hyperlink associations according to embodiments of the invention.
Figure 7B:
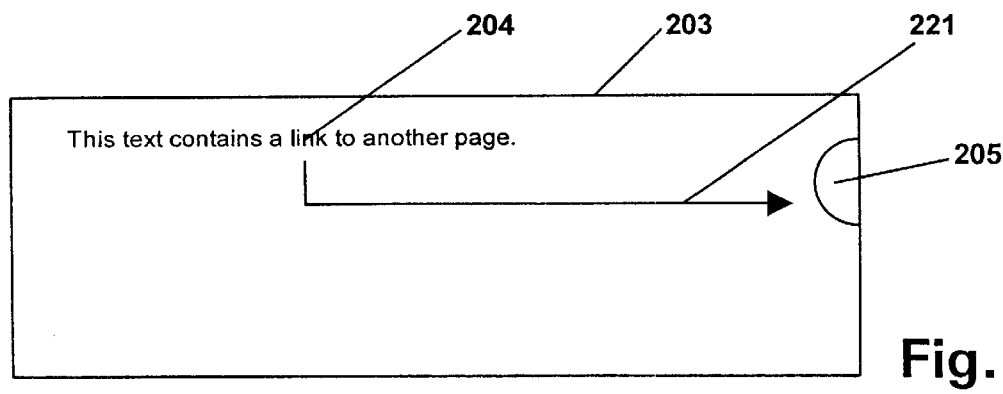
Figure 7C:
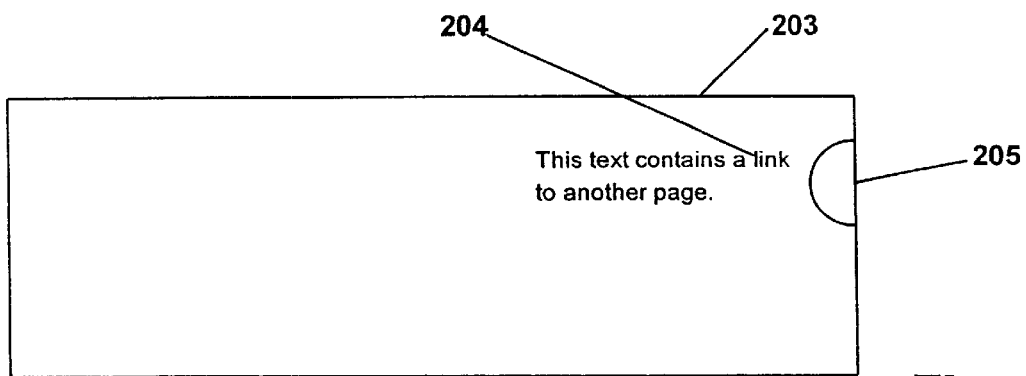

FIGS. 7A to 7C illustrates some examples of possible hyperlink treatments for the purpose of associating hyperlinked content from first document 10, with tabs or cutouts or other physical hyperlink element or elements within printed document 40. The examples in FIGS. 7A to 7C may be derived from the example HTML syntax in FIG. 4, which illustrates a textual element containing a single word, "link" which has a hyperlink associated with it. Generally, unless the user specifies otherwise, a hyperlinked element, such as the example given, "link", is associated with a physical hyperlink in document 40, where the physical hyperlink typically takes the form of a cutout or tab or similar. This combination or association of hyperlinked element and physical hyperlink is typically and purposefully made to provide an operative, actual and active hyperlinking facility in the printed and cut document, 40 which mimics, parallels, or recreates the original hyperlinking facility within the first document 10.

In FIG. 7A, a page 203 contains a sentence with a hyperlink originally associated with the word "link" in the first document 10. In the printed and cut document 40, the preferred embodiment makes a visual and direct association between the hyperlinked word "link" 204, and a physical hyperlink tab or cutout-; 205, which is created and allocated for the purpose of effecting the hyperlink action. In FIG. 7A, the hyperlink and text are loosely associated with the physical hyperlink cutout 205, by allocating relatively close positioning for the two elements and with the addition of a printed symbol 220 next to or near to physical hyperlink 205. The symbol 220 is placed adjacent to physical cutout 205 to mark it, to give it meaning and to draw attention to it and, usually, to associate physical hyperlink cutout, 205, with the original hyperlinked text, 204. Further in FIG. 7A, the association between the hyperlinked word 204 and the cutout 205, depends on the selection of a suitably explanatory graphic, image or text element at 220. Such a selection and/or treatment may be controlled by an automated processing template or script, or by the user.

In a second example seen in FIG. 7B, an arrow 221 is drawn between the hyperlinked word "link" 204, and the physical hyperlink cutout 205. The arrow 221 serves to provide a direct visual connection between the hyperlinked word 204 and the physical hyperlink 205.

A third example of treatment or highlighting of a hyperlink is indicated in FIG. 7C. There, the textual element is repositioned and reformatted to directly place the hyperlinked word "link" 204, immediately adjacent the physical hyperlink cutout 205. This adjacent positioning serves to provide a direct visual connection or association between the hyperlinked word 204, and the physical hyperlink 205.

Figure 5A:
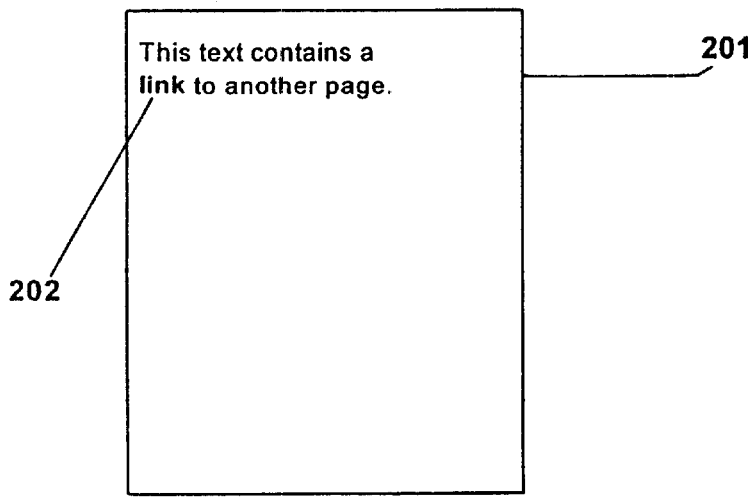
FIG. 5 is an example of a hyperlink conversion according to the preferred embodiment.
Figure 5B:
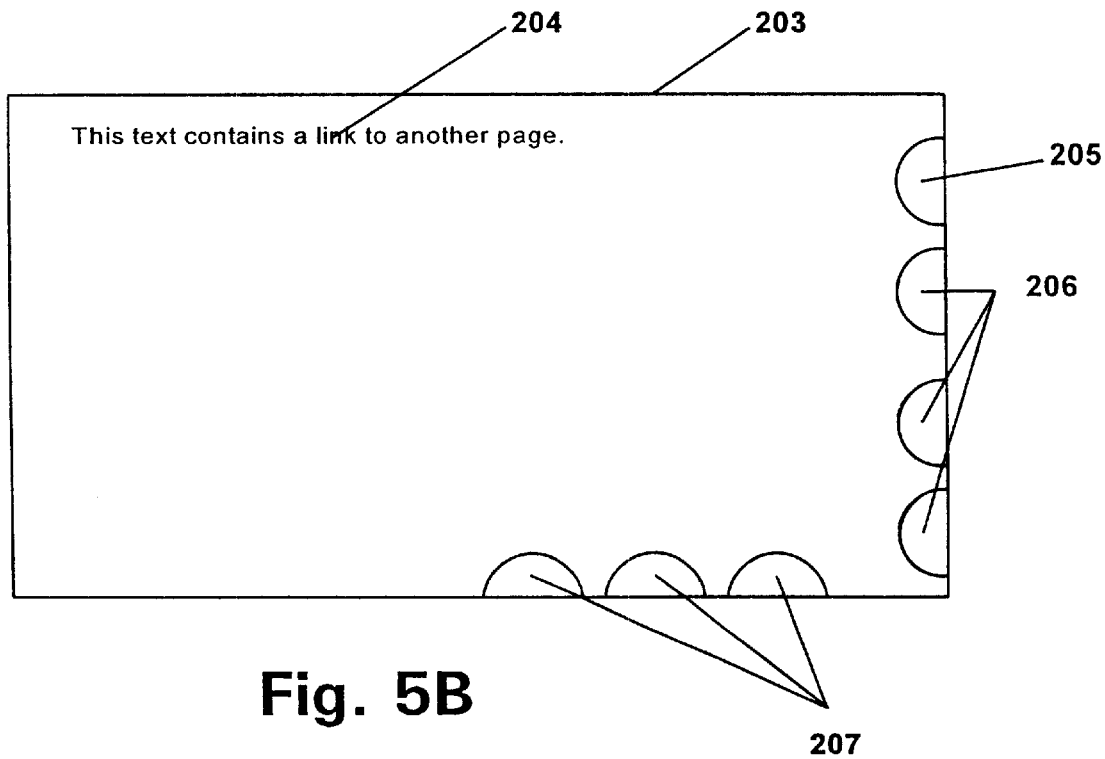

Many other methods of treatment or highlighting of hyperlinks or association of hyperlinked elements with physical hyperlinks are possible. Treatments or association methods may vary with the details or attributes of a hyperlink within the original document 10. For instance, treatment may vary depending on whether the hyperlink was part of a heading, or body text. In addition, the method implemented for treatment of a hyperlink may vary according to user control or template influence or similar. The options for treatment of a hyperlink, including the method of associating a hyperlinked element with a physical hyperlink, may be controlled or, selected from many possible information sources, including user input, parameters or properties within the original first document 10, associations or references within first document 10 to style sheets, automatic or manual selection of a processing or treatment template or procedure or also by adoption of a default treatment or procedure in the absence of some or all of the aforementioned information sources. The same options may be available per element or element type in addition to on a per page or per document or per page type or per document type basis, FIGS. 5A and 5B illustrate how a hyperlink 202 in a source document 201 may be reproduced using a number of finger cut-outs 205,206,207 on an output document 203 having the same visual hyperlink 204.

Step 155 of. FIG. 3 may include known treatment or processing steps and typically relating to printing of documents. In addition, the preferred embodiment provides the additional or alternative treatment or processing option for document formatting and/or hyperlink attribute enhancement within step 155, particularly for printing, cutting and/or binding of documents, including for printing, cutting or binding of single or double-sided documents or any combination of these.

Step 155 may be followed by one or more iterations through steps 151, 152, 153, 154, 155, depending on the user control and other constraints. Typically it may be necessary to iterate through the reformatting and placement step 154, because step 155 may influence the document layout in various ways, possibly causing layout errors or requiring elements to be moved or modified near treatments applied to hyperlinks and physical hyperlinks. Generally, if any modification of the document properties, layout, etc has been effected, then steps 152, 153 may need to be repeated.

Step 156 involves the optional presentation on a display of a representation of the reformatted, processed and treated document 40, prior to the final operations of printing, cutting and binding to actually produce document 40. The step 156 is typically known as WYSIWYG (ie: "What you see is what you get"). The user may take this opportunity to check the document presentation and to effect revisions of the user controls and options if desired. Such changes may require reiteration of earlier steps 151, 152, 153, 154, 155 and 156 to check or to modify the document structure and attributes so as to avoid violation of any preset, assumed, derived or selected constraints relevant to these steps.

Step 157 involves the final calculation of the start and end position attributes of all hyperlinks within document 40. Step 157 is similar to step 153 and the procedural loop indicated may be rearranged to combine these steps with an equivalent result. Step 157 replaces the hyperlink attributes recorded from first document 10, with the attributes from the reformatted document 40. These attributes, now relevant to the domain of a printed and cut and/or bound document, are used for the purposes of grouping, positioning and associating hyperlink-associated content elements and physical hyperlinks within the domain of an entire document, typically containing multiple pages.

Following step 157, step 105 as seen in FIG. 2 offers the user the option to select or deselect hyperlinks or physical hyperlinks for display, printing or cutting within the printed and cut document 40. If the user chooses to modify the status, inclusion, printing or cutting of a hyperlink or physical hyperlink in document 40, then such changes may require alteration or compensation in the document format, layout, presentation properties, etc and an iteration may be required for steps 104 and/or 105 to reprocess the document 40. This decision to reprocess may be made separately or jointly by the user or the particular implementation of the invention. The user's option to select or deselect hyperlinks or physical hyperlinks for display, printing or cutting in step 105 is provided to permit the user to generate an optimal or customized format for the document 40 and hyperlinking strategy. For example, the original document 10 may have included a large quantity of hyperlinks which cannot practically be reproduced as physical hyperlinks because of physical spatial constraints for example, or for presentation and ergonomic reasons where a plethora of physical hyperinks may have a negative effect on the presentation or ease of use of the document 40. Other reasons may exist for selecting or deselecting hyperlinks and physical hyperlinks for inclusion in a document, including for achieving some intended style or appearance, or for information presentation reasons, for instance for reducing clutter and enhancing high priority information, and so on. Such selection or deselection decisions may also be performed by automatic means or a combination of automatic and manual means, including under the control of templates, media parameters, properties or constraints, etc and as described for steps 151, 152, 153.

Step 106 involves the automatic, manual or interactive selection of the physical position of one or more hyperlinks, including optional grouping and positioning of a plurality of hyperlinks. The grouping or positioning of hyperlinks includes grouping or positioning or association between one hyperlink and another hyperlink, or between one hyperlink and a number of hyperlinks, or association between hyperlink and physical page properties, or an association between a hyperlink and physical document properties and includes optional groupings or position in one or any combination of all three physical, spatial dimensions, where the surface of a single page may be considered as containing two spatial dimensions. Also the absolute page number, or relative page number, physical document depth, leaf side, page side (in a two-sided document) or other equivalent description may describe, and be equivalent to, the third spatial dimension. Information suggesting grouping and/or positioning of hyperlinks, either singly or in a plurality, may be automatically derived from information available during any of its previous steps. For instance, the original hyperlink information may have been grouped on one page or in one headed section of the original document, 10, or hyperlinks having the same hierarchical level, for instance, having the same header level declaration in HTML syntax, may be grouped. For example, FIG. 6 shows a typical HTML hyperlink syntax in the first line of text, where a hyperlink is explicitly associated with a textual element which is explicitly raised to a header level of 1. There may be many kinds of hyperlink grouping and positioning information and there may be many methods for automatically interpreting hyperlink grouping and positioning information. The selection of which method or methods of selecting or interpreting hyperlink grouping or positioning information may be by means of default methods implemented at the inventor's discretion, or by means of analysis or recognition of the format of the input document 10 and by selection of an appropriate analysis technique which results in an optimal or acceptable hyperlink grouping and positioning. Alternatively, a user's selection of a template which may specify many parameters or which may control many processes of the preferred embodiment, including the hyperlink grouping or positioning information analysis and interpretation and resultant placement in order to achieve a consistent or familiar style, method, presentation or result at the output can be applied.

Further options within step 106 include the option for the user to override or modify aspects of the grouping and positioning data or decisions. The user may optionally compound or iteratively modify the grouping and positioning information, and typically, a WYSIWYG or partial display of the expected output is provided to assist and guide the user during this procedure. Step 106 may be repeated in a loop or loops with other steps as indicated in FIG. 2, passing control via steps 113 or 114 to previous steps, as the user or as the method of the invention decide are necessary. Other implementations may combine step 106 with one or more of the other steps, for instance, step 105, to provide a combined operation to the user and also to possibly provide more related information at one stage to allow better automatic control and decision making within the invention's process steps. Step 106 may also occur at a different stage in the flowchart of FIG. 2, where it may be used to constrain other processes, such as that in step 105, for instance. An example of this optional implementation may include where step 106 precedes step 105 and step 106 constrains the grouping and positioning of hyperlinks, by automatic or manual means or both, so that decisions made in the following step 105 are constrained by this predetermined grouping or positioning to, for instance, determine, or partially determine implicitly or explicitly the priority of hyperlinks which may be selected and printed or cut to the exclusion of lower priority hyperlinks.

Step 107 involves automatic, manual or interactive selection of the type or types of printing, marking, or identifying, by visual, tactile or other means, or other physical presentation of one or more hyperlinks, including the method or methods of associating hyperlinks with one or more document or page elements, particularly but not exclusively, printed elements, within one or more pages. Step 107 may be additional to similar decisions, analyses or options or operations previously performed in step 155 of FIG. 2. Typically, step 155 would involve automatic or default operations, based on analyses of input dam and prior control or formatting template selection or similar, whereas step 107 may typically involve significantly more user interaction or control and may also include additional data from steps 105 and 106 which was typically unavailable in step 155 and which may influence automatic or manual decisions made in step 107. Step 155 was performed earlier to typically provide enough information about proposed or default document elements, structure attributes to permit meaningful processing and decision-making in subsequent steps. Step 107 then provides the opportunity to revise or finalise such attribute values or decisions previously made in step 155. Amalgamation or other association of process steps 155 and 107 is possible while retaining an equivalent method of invention.

In the example of FIG. 7A, the physical hyperlink 205 is highlighted by a graphic element 220, which is printed nearby. This element may have been copied or extracted from the original document 10, or it may have been introduced by the embodiment or by the user to bring attention to or a style of presentation to hyperlink 205. In addition, the hyperlink 205 is associated with textual element 204 by general positioning of the two in the same area, Another example of positional association is seen in FIG. 7C in which the textual element 204 is positioned directly adjacent to the hyperlink 205. The middle example of FIG. 7B illustrates a more direct association method between hyperlink 205 and textual element 204, by the method of printing a connecting arrow or equivalent feature 221. One typical and easily derived association allowing the printing of arrow 221 may be obtained by detecting from original document 10, the explicit association of a document element with a hyperlink. For example, such an association is expressed in HTML syntax in FIG. 4 in which the textual element, word "link" is explicitly associated with the HTML hyperlink property. Therefore, the preferred embodiment may detect this explicit association and render the physically hyperlinked document, 10, as shown in the in FIG. 7B, with the printed textual element word "link" 204, directly associated with the hyperlink 205, by adding a feature, such as the printed arrow 221.

Information suggesting hyperlink presentation and/or element association, either singly or in a plurality, may be automatically derived from information available to the invention or inferred by it during any of its previous steps. For instance, the original hyperlink information may have been grouped on one page or in one headed section of the original document 10, indicating a possible association between page elements and hyperlinks. Such information is typically available from HTML documents wherein hyperlinks are normally associated with document elements, typically text or images, and such associations are easily detectable and such associative information may be directly utilized in step 107 to associate or present hyperlinks with document elements.

For instance, FIG. 6 shows an example of a typical HTML hyperlink syntax in the first line of text, wherein a hyperlink is explicitly associated with a textual element. There may be many kinds of hyperlink presentation and/or element association information and there may be many methods for automatically interpreting hyperlink presentation and/or element association information. The selection of which method or methods of selecting or interpreting hyperlink presentation and/or element association information may be by means of default methods implemented at the user's discretion, or by means of analysis or recognition of the format or syntax or hierarchical type or presentation style of the input document 10 and by selection of an appropriate analysis technique which results in an optimal or acceptable hyperlink presentation and/or element association. Alternatively, this can be achieved by means of a user's selection of a template which may specify many parameters or which may control many processes of the embodiment, including the hyperlink presentation and/or element association information analysis and interpretation and resultant placement in order to achieve a consistent or familiar style, method, presentation or result at the output.

Further options within step 107 include the option for the user to override or modify aspects of the hyperlink presentation and/or element association data or decisions. The user may optionally compound or iteratively modify the hyperlink presentation and/or element association information, and a WYSIWYG or partial display of the expected output may be provided to assist and guide the user during this procedure. Step 107 may be repeated in a loop or loops with other steps as indicated in FIG. 2, passing control via 115 or 116 to previous steps. Other implementations may combine step 107 with one or more steps, for instance, steps 105 and/or 106, to provide a combined operation to the user and also to possibly provide more related information at one point to allow better automatic control within the invention's processes, Step 107 may also occur at a different point in the flowchart of FIG. 2. including at an earlier point, where it may be used to constrain other processes, such as that in step 106, for instance. An example of this optional implementation may include where step 107 precedes step 106 and step 107 constrains the hyperlink presentation and/or element associations, by automatic or manual means or both, so that decisions made in the following step 106 are constrained by this predetermined grouping or positioning to, for instance, determine, or partially determine implicitly or explicitly the grouping or positioning of hyperlinks within one page or within a collection of possibly associated pages.

Figure 8A:
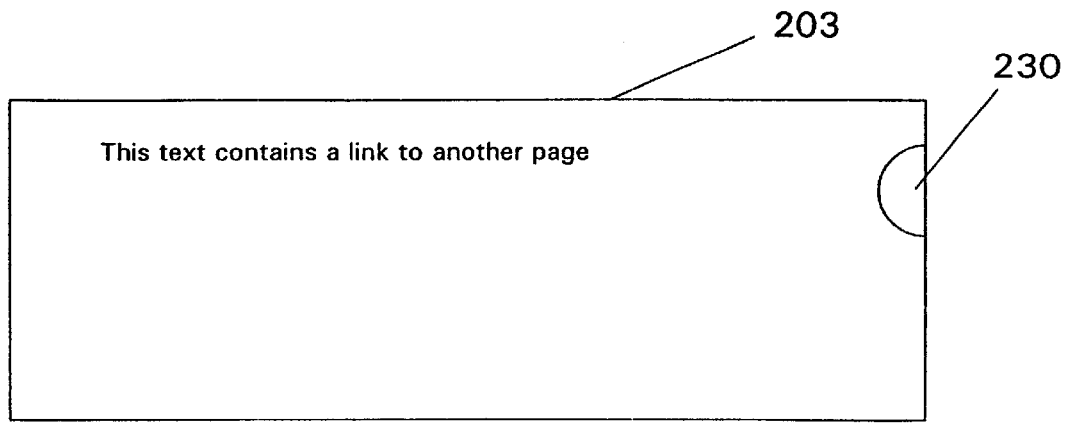
FIGS. 8A–8C show examples of hyperlink formats according to embodiments of the invention.

Step 108 involves automatic, manual or interactive selection of the type or types of hyperlink physical implementation, for instance, the method of cutting of the physical hyperlink tab or finger hole or other physical implementation, including any tactile implementation which achieves the same effect of optional non-linear movement through a document. FIG. 8 indicates three examples of hyperlink implementation on a page 203. In FIG. 8A, a physical hyperlink 230 is implemented by a cut or fingerhole in the edge of the document page. Such a cut may be performed in many document pages, preferably aligned so as to overlap when the pages of the document are aligned to overlap. The hyperlink 230 may be activated by the user placing a finger or thumb within the cut-out and locating the first uncut page surface above or below the cutout, whichever is appropriate, implied or indicated, and next opening that corresponding page or pages, typically by grasping the said surface of the first uncut page above or beneath the hyperlink hole.

Figure 8B:
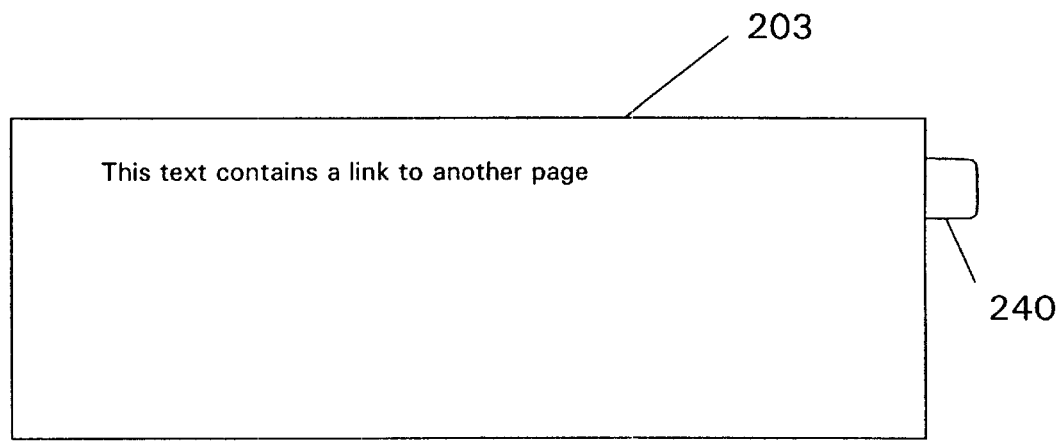

FIG. 8B indicates another implementation example for a physical hyperlink 240, in which a tab is presented for, typically, grasping between finger and thumb and opening at the page indicated by the tab. In this implementation, the tab 240 is typically connected with or forms part of the destination page and not part of the current page, as doesis the hyperlink finger hole 230 of FIG. 8A. Typically, therefore, the tab 240 is provided with some form of association with document or page elements on pages other than the page to which it is connected or a part of. For example, in FIG. 8B, the hyperlink tab 240 will generally be connected with a page below page 203. Tab 240 is preferably labelled printed, cut, positioned or otherwise associated with an element, for instance the textual element shown, on page 203 and therefore hyperlink 240 will display and will also effect a hyperlink between the textual element on page 203 and the page connected to hyperlink tab 240.

Figure 8C:
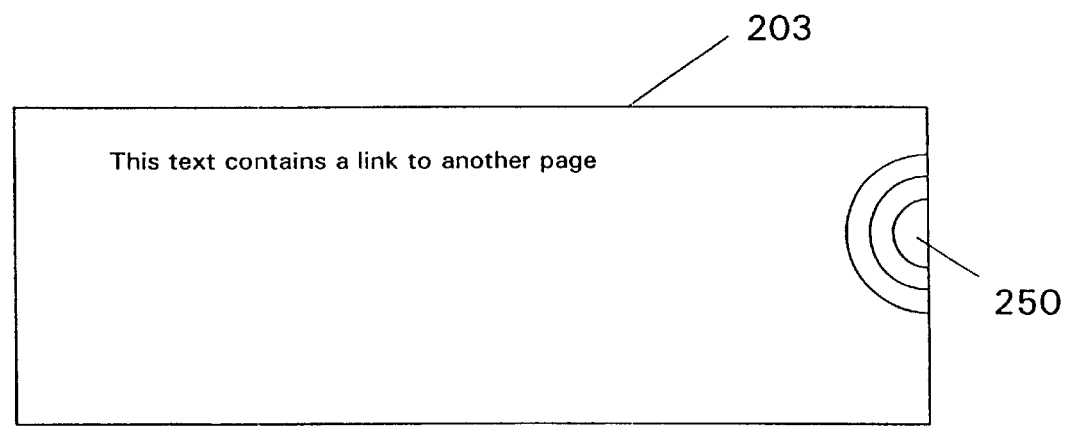

FIG. 8C indicates a third example of a physical hyperlink implementation in which several hyperlinks are grouped and associated together. A hyperlink 250 seen in FIG. 8C represents a group of nested finger-hole cutouts of varying but coordinated and progressive size, and of elliptical shape which allow a user to select which hyperlink and therefore which destination page to traverse to by simply moving the thumb or finger slightly to grasp the desired size of ellipsoidal cutout. In conjunction with this implementation example of a physical hyperlink or a plurality of physical hyperlinks, other attributes or features may be included, such as highlighting or colour-coding of the differing sizes of ellipsoidal cut-out, association by colour or other attribute of ellipsoidal cutouts with different elements of a page or pages or other equivalent or equivalently effective methods.

Information suggesting hyperlink physical implementation, either singly or in a plurality, may be automatically derived or inferred from information available to the invention during any of its previous steps. For instance, the original hyperlink information may have been grouped on one page or in one headed section of the original document 10, indicating a possible association between page elements and hyperlinks. Such information is typically available from HTML documents wherein hyperlinks are normally associated with document elements, typically text or images, and such associations are easily detectable and such associative information may be directly utilized in step 108 to determine the appropriate or preferred or optional implementation of hyperlinks. For instance, the selection, grouping, positioning or association of hyperlinks made within steps 105, 106, 107 may be used to select, imply, modify or constrain the method of implementation of one or more hyperlinks or hyperlink groups. There may be many kinds of hyperlink physical implementation information and there may be many methods for automatically interpreting hyperlink physical implementation information. The selection of which method or methods of selecting or interpreting hyperlink physical implementation information may be by means of default methods implemented within the process at the user's discretion, or by means of analysis or recognition of the format, syntax, hierarchical type or presentation style input document 10 and by selection of an appropriate analysis technique which will result in an optimal or acceptable hyperlink physical implementation association.

Further options within step 108 include the option for the user to override or modify aspects of the hyperlink physical implementation data or decisions. The user may optionally compound or iteratively modify the hyperlink physical implementation Information. A WYSIWYG or partial display of the expected output can be provided to assist and guide the user during this procedure. Step 108 may be repeated in a loop or loops with other steps as indicated in FIG. 2, passing control via paths 117 or 118 to previous steps, as the user or as the method of the invention decide are necessary. Equivalent implementations may combine step 108 with one or more steps, for instance, steps 105 and/or 106, and/or 107, to provide a combined operation to the user and also to possibly provide more related information at one point to allow better automatic control within the invention's processes. Step 108 may also occur at a different point in the procedure of FIG. 2, including at an earlier point, where it may be used to constrain other processes, such as that in steps 105, 106 or 107, for instance. An example of this optional implementation may include where step 108 precedes step 107 and step 108 constrains the hyperlink physical implementation or implementations, by automatic or manual means or both, so that decisions made in the following step 107 are constrained by this predetermined implementation or implementations to, for instance, determine, or partially determine implicitly or explicitly the highlighting, printing or other identification or presentation means of hyperlinks within one page or within a collection of possibly associated pages.

Step 109 involves the final processing of all input data, user options, selections, variables, for producing or describing the expected output document or result, typically, in some digital file format or equivalent construction. The file format is configured to be ready for execution or implementation by a device or devices arranged to perform the physical rendering, printing, cutting or other physical processes seen in step 110,—required to achieve the output document creation, or intended result, for example using the printer 64 of FIG. 10.

Figure 12:
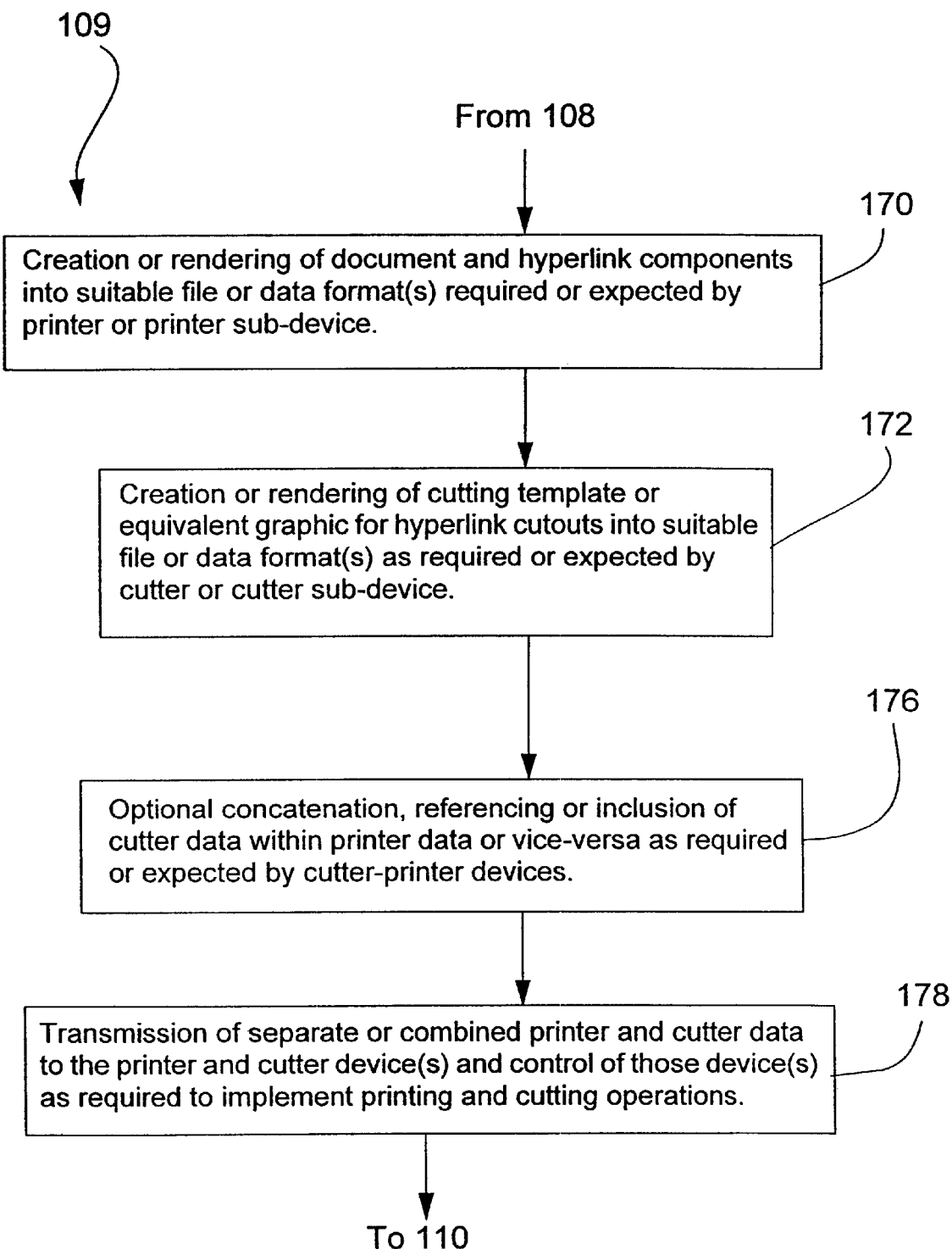
FIG. 12 is a flow diagram of step 109 of FIG. 2.

FIG. 12 shows the various steps that are implemented in the preferred embodiment for instructing and controlling the physical reproduction system, typically including and printing and/or cutting device, such as those described above for example.

Step 109 commences with a sub-step 170 which actions the creation or rendering of document and hyperlink components into suitable file or data format(s) required or expected by printer or printer subdevice, This for example may include formatting using a page description language (PDL) or some file format such as POSTSCRIPT (registered trade mark) for example. This may include any set of instructions or data suitable for reproduction on a printer device, as known in the art.

Step 172 follows step 170 and actions the creation or rendering of a cutting template or equivalent graphic for hyperlink cutouts into suitable file or data format(s) as required or expected by cutter or cutter sub-device, This, for example, may include formatting instructions and data suitable for interpretation by the FC3100-60 Cutting Plotter described above.

Further, as mentioned above, where the printer and cutter are unitarily formed as a single unit, such as the Fargo Impressa mentioned above, steps 170 and 172 may be implemented simultaneously or alternatively as a single step appropriate for the corresponding reproduction environment. Still further, steps 170 and 172 may be swapped in processing order where such are separate functions.

Step 176 follows and provides for the optional concatenation, referencing or inclusion of cutter data within printer data or vice-versa as required or expected by utter-printer devices. Such may be appropriate where the printer and cutter are unitarily formed and respond to a common series of instructions and/or data, but the individual printer and cutting data are separately developed.

Finally, step 178 actions the transmission of the separate or combined printer and cutter data to the printer and cutter device(s) as appropriate and control of those device(s) as required to implement printing and cutting operations respectively. In practice, where separate printing and cutting devices are used, one may follow the other in an automated "production line" fashion. Alternatively, printing and cutting operations may be performed essentially asynchronously. Such could apply to the implementation where the sheets of paper are printed as a large patch, and subsequently the printed sheets are supplied to the cutter, such as the FC3100-60 Cutting Plotter.

Figure 9:
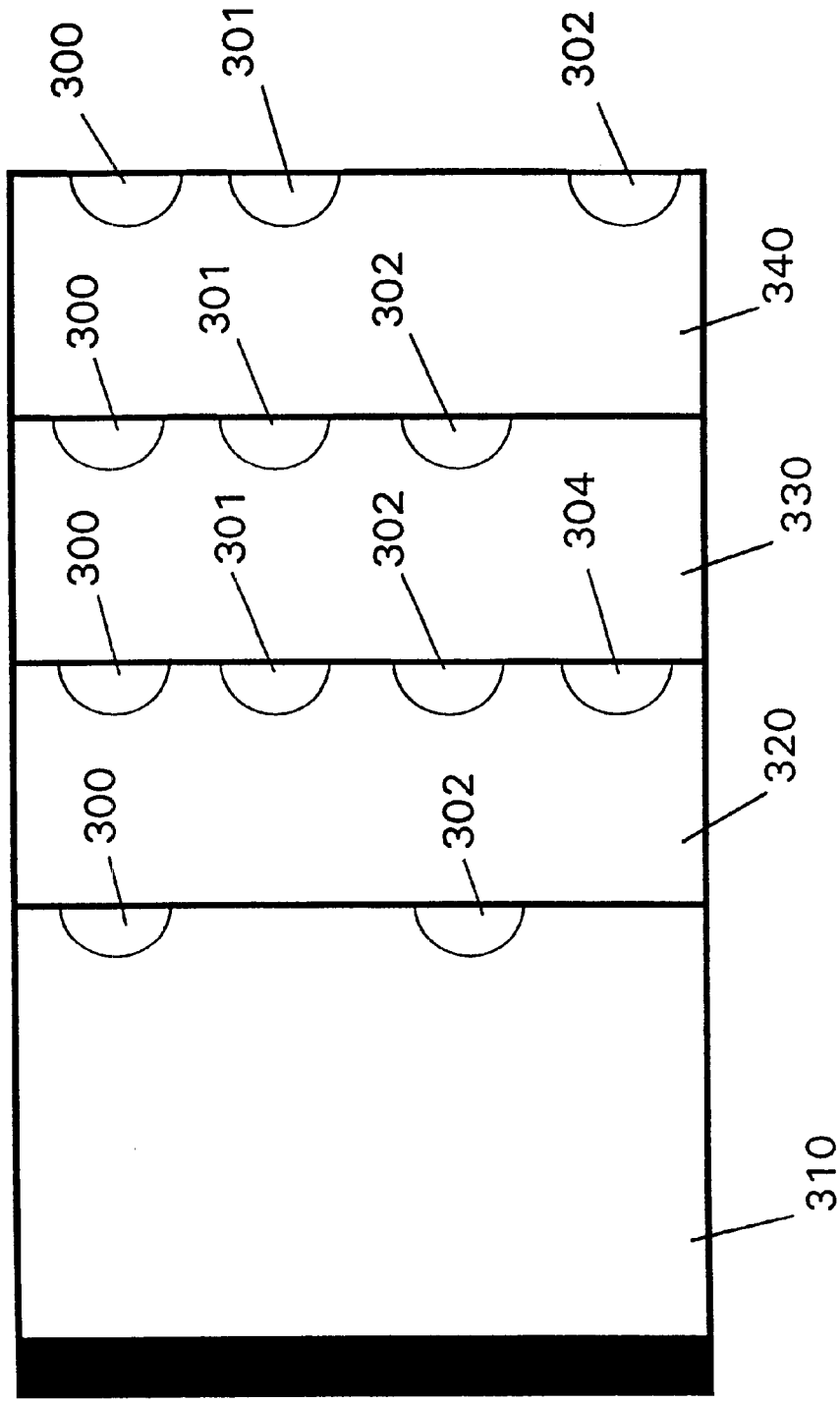
FIG. 9 illustrates a document formed using an embodiment.

The resulting physical document may include physical hyperlinks in patterns not dissimilar to the example shown in FIG. 9. In this example, four separate leaves 310, 320, 330, 340 are bound together and overlaid in sequential order with leaf 310 on top followed by leaf 320, leaf 330 and leaf 340 on the bottom. The leaves are shown slightly horizontally offset in FIG. 9 to aid description of the hyperlinked physical document. Hyperlink 302 may represent a typical physical hyperlink of the finger-hole type in which a hole is cut or punched or otherwise manufactured in several consecutive leaves of the document with the destination leaf or page 340, not containing such a finger-hole, but retaining its surface for grasping by the user to aid in direct opening of the destination leaf or page indicated by hyperlink 302. In such an embodiment of a physical hyperlink, the surface of leaf or page 340 which is visible through the finger-hole hyperlink cutout 302, may be highlighted, printed or otherwise decorated, featured or annotated to allow indication of some detail of the hyperlink or otherwise to aid in clarity or identification or some similar attribute useful to the user. In this embodiment of a hyperlink, 302, the destination leaf or page 340, is accessible from any of the leaves or pages, 310, 320, 330, which include the finger-hole cutout aligned and contiguous with all leaves up to 340. Such an embodiment may be applicable to single-sided documents in which one leaf contains only one printed page, or in double-sided documents in which one leaf may contain two pages, typically one page on each side of a leaf. The method of implementing physical hyperlinks may be, if necessary, adjusted to suit either document type, in which case the terms leaf and page may be interchanged as appropriate in the preceding and following descriptions to describe hyperlink implementations in either single-sided or double-sided documents or some combination of both.

Another embodiment of a hyperlink is also shown in FIG. 9 as hyperlink 301 in which a reversed implementation is employed to allow hyperlinking from the rear of a document towards the front. Traditionally, documents are read in one direction or are presented as having a single direction of progression or may typically be presented with a heading or first page in a conventional directional relationship to a last or final page. This relationship may differ between cultures or countries but is typically standard in any locale and/or written language. The addition of physical hyperlinks allows non-linear access to a document and therefore releases the user from progressive or linear reading of an entire document, document section or part or page or part page, in one direction. Thus, hyperlinks of type 301 and 302 in FIG. 9 together allow any physical hyperlinked document to be accessed in any direction the author desired and also, within the constraints authored, within the document, permit the user to access the document's contents with greater freedom, more direct control, quickly, and with less ambiguity by actively encouraging and enabling the immediate or direct following of references or hyperlinks encountered or sought within the document.

FIG. 9 also shows another embodiment of physical hyperlinking in which two different hyperlinks, each with its own destination, are stacked atop each other without interference. This embodiment may typically be employed where one or more hyperlinks do not require access from any or all pages of a document but which may have a localised access or reference point. For instance, hyperlink finger-hole 304 in page 320 allows reverse access to page 310. This example shows that page 310 is only accessible through this particular hyperlink, 304, from page 320. Similarly, hyperlink 303 in page 340 allows reverse access to page 330, but only from page 340. Since one or more full leaves or pages lie between these hyperlinks. where the leaves or pages are themselves devoid of hyperlinks or other potentially interfering elements in the two-dimensional pagecoordinate region of hyperlinks 303 and 304, then it is possible to overlap hyperlinks 303 and 304 without interference between their functions or without confusion as to their operation or association or intent. Other similar or analogous arrangements, groupings, associations or overlaying of hyperlinks, of many different physical implementations are possible, each with its own rules or constraints or conditions.

The ability of the user to modify the document and referential link generation process in the manner described above affords substantial utility in producing documents, either in electronic or hard copy form that are tailored to the specific tastes of the author/user. For example, with a fully automated implementation there exists a 1:1 relationship between the hyperlinks in the source document(s) and the referential links in the hard copy reproducible document. However, with user intervention, referential links automatically created may be disabled (a 1:0 relationship) thus avoiding the creation of links that may not be desired. Further, the user may create their own links, thus providing for, in a generic sense, an M:N relationship, where $M \geq 0$ and $N \geq 1$, M and N each being integers. Such may impact upon the specific implementation of the preferred embodiment since HTML only allows a hyperlink to point to one site, usually identified by a universal resource location (URL). In contrast, XML provides for a link to point to a range of URL's. This permits the preferred embodiment the ability to group together hyperlinks according to some grouping criteria such as style and content for example. The grouping may then provide for the referential links in the hard copy reproducible document to be formed in a like fashion, for example using the same colour, or by positioning cut-out and tabs in some form of associated, by nesting for example.

The identification of various hyperlinks within electronic documents, particularly those available within computer networks such as the World Wide Web, can sometimes lead to problems of accessing the corresponding information residing at the identified location. This occurs for example where a document at one Web-site references something residing at another Web-site. Because of the temporal nature of the WWW, it occasionally transpires that the referenced location no longer exits, or that no information resides at the referenced location (a'so-called "dead end URL"). In these situations, the preferred embodiment is configured to identify such a situation and not attempt to create a corresponding functional link within the locally generated document. However, the preferred embodiment may retain such references in a fashion complementing prior art techniques, for example as a listing at the end of the document, or as a footnote within the document. This avoids localized document being generated including erroneous or unnecessary functional links whilst retaining the raw information relating to the hyperlink within the document. Such processing finds ready application where the referenced URL accesses data other than text or image data readily reproducible in hard copy form, such as audio data, video data, or an executable program to name but a few. The same procedure can be applied to those valid hyperlinks that are not desired to be retained as functional links (ie: the 1:0 cases noted above).

In addition to the described embodiments, the invention may be partially or wholly applied to producing any non-physical or virtual representation of a physical document or page. For instance a physical hyperlinked document may be represented in a visual manner on a display device, such as the display 65 of FIG. 10, while no actual physical document exists. The virtual representation of the physical hyperlinked document may include physical hyperlinks, such as tabs or finger-holes which operate equivalently in the virtual representation to the real, physical implementation of the same features in a real, physical hyperlinked document. For example, the virtual representation of the physically hyperlinked document may provide touch-screen or equivalent functionality which permits the user to place a finger or to otherwise effect a touch signal or mouse-click or key-press or equivalent signal to a virtual representation of a hyperlink tab or finger-hole or equivalent feature. The virtual representation of the hyperlinked document may then effect an equivalent operation to that expected in a physical hyperlinked document, that being a single or multiple page, turn operation as controlled by the parameters embodied in the, hyperlink activated by the user. Preferably, such functionality is afforded whenever the WYSIWYG representation of the document is utilized in the embodiments described above. Significantly, during document creation, this can afford the author (user) the ability to test the functionality of the virtual hyperlinks as they would be replicated in a physical document, thereby allowing human intervention to sculpt the layout and hyperlinking style of the document.

In a further embodiment, the invention may also be applied to produce compound second documents 40, whether the first document 10, was a compound or single document. The compound second document 40 is produced in such a way as to enable the user to separate out two or more distinct sections which may independently contain their own locally consistent relative hyperlinking functionality as well as external hyperlinks which interconnect the multiple documents when they are reunited in the intended order and format. This feature permits the nesting of printed hyperlinked documents so that the user may remove or separate, so as to make independent, one or more of the nested documents, whilst the hyperlinking functionality is retained internally within the independent documents. The user may choose to reunite the separate documents in the preferred or intended order so that the previously separate documents become interconnected by common and previously established hyperlink functionality. Several methods may be implemented within the previous description of the preferred embodiment of the invention to produce such compound document or documents. One example is to produce the first part of a compound document as a separate document without reference to the second part of the compound document whilst retaining as much information as possible from the process of production of the first part of the compound document and utilizing that information in the production of the second part of the compound document, making reference to the elements, properties, hyperlinks, attributes, user selections and other information from the first part for use in production of the second part. Another example is to process the compound document as one document with additional information possibly provided by the user or interpreted or assumed automatically from input data or from the elements and structure of original document 10, such that each subdocument or part of the compound document has several features or parameters or attributes isolated from the same or similar features, parameters or attributes within the remainder of the compound document. For instance, the grouping and positioning of physical hyperlinks, and possibly other elements may be made so that an artificial or constructed attribute or property boundary or boundaries may be created or introduced between parts of the same compound document during creation, conversion or processing of the compound document so as to produce a physical compound document. This can then permit subtraction or removal of a part, which removable part is described or identified by the introduced boundary or boundaries. These principles or methods may also be applied as described or iteratively to produce compound documents containing more than two parts or sub-documents. Examples of such compound documents include references having a table of contents, appendices to larger documents and multi-volume documents such as encyclopedia.

Although the above described embodiments refer in general to the generation by a user of a document derived from typically a number of sources accessible via a computer network, the invention is not limited thereto and may be equally applied to a document generated locally, for example on a single personal computer workstation. A further extension of this may include the generation of the user interpretable functional links as part of the document creation process. In this fashion the physically reproducible link may be generated upon the creation of the document content in response to user (author) input.

The foregoing described only a number of embodiments of the present invention and modifications, obvious to those skilled in the art, can be made thereto without departing from the spirit and scope of the present invention.

What is claimed is:

1. A method of creating a representation of information from at least one electronically accessible source of said information, said information including at least one referential link between first matter in said information and second matter in said information, said method comprising the steps of:

electronically extracting said information from said at least one source;

identifying said referential link to establish a corresponding referential path between the first matter and the second matter;

arranging the information as a document in a format suitable for hard copy reproduction in which each of said first matter and said second matter are individually identifiable; and using said referential path to provide in said document, a user-manipulable functional link that refers a user from a first portion representative of the first matter to a second portion representative of the second matter on the hard copy reproduction.

2. A method according to claim 1, wherein said first and second matter comprise corresponding first and second locations within said information.

3. A method according to claim 1, wherein said first and second matter comprise corresponding first and second content within said information.

4. A method according to claim 1, wherein said information at said source forms an electronically accessible non-linear document and said document comprises said matter arranged in a linear fashion, said method preserving original referential links in said document using said functional links to provide a non-linear means for accessing said matter within said document.

5. A method according to claim 1, comprising the step of creating a sequential document from said extracted information and inserting into said sequential document at least one non-sequential link between said first matter and said second matter.

6. A method according claim 1, wherein said information is from a nonlinear source and said arranging includes arranging said information to be linear within said document.

7. A method according to claim 1, wherein said referential path is updated and maintained whilst the information is being arranged into said format.

8. A method according to claim 7, wherein said format comprises at least one displayable page for reproducing the information and said referential path comprises a mapping between the first matter and the second matter as those matters are reproducible said at least one displayable page.

9. A method according to claim 1, wherein said referential link comprises a hyperlink between the two matters.

10. A method according to claim 9, wherein said information is sourced as data network and said hyperlink represents a virtual path interconnecting first matter with the second matter via the data network.

11. A method according to claim 1, wherein the functional link comprises an observable device that refers the user from the first matter to the second matter, said device being incorporated into said format in addition to said information.

12. A method according to claim 11, wherein observable devices of one functional link are reproducible in a first colour scheme and observable devices of another functional link are reproducible in a second colour scheme different front the first colour scheme.

13. A method according to claim 11, comprising the further step of displaying said document upon a medium using a hard copy reproduction device.

14. A method according to claim 13, wherein the incorporation of said referential path comprises physical alteration to said medium.

15. A method according to claim 13, wherein said device imp comprises a rendered link coupling the two matters.

16. A method according to claim 15, wherein said device comprises a portion on a first display page that provides a link between the first matter on said first display page and the second matter on a second display page.

17. A method according to claims 16, wherein the information is arranged for display by printing said functional link onto said medium.

18. A method according to claim 16, comprising the further step of displaying said document on a display screen.

19. A method according to claim 18, wherein said functional link comprises selectable portions that emulate a hard copy reproduction of said document.

20. A method according to claim 19, wherein said portion comprises an icon incorporated in the display of said document manipulable to transverse the displayed document from the first matter to the second matter.

21. A method according to claim 13, wherein said portion comprises a physical alteration of said medium.

22. A method according to claim 21, wherein said portion comprises a tab attached to the medium.

23. A method according to claim 21, wherein said portion comprises a cutout in the medium.

24. A method according to claim 23, wherein said document comprises a plurality of said cutouts, at least two of said cutouts being nested at corresponding locations on different pages of said document.

25. A displayable document comprising information for hard copy reproduction, said information including a identifiable first link between first matter within said document and second matter within said document, to provide in said document a user-manipulable functional second link that refers a user from a portion representative of the first matter to a portion representative of the second matter on the hard copy reproduction of said document.

26. A document according to claim 25, wherein said information is extracted from a non-linear source and said document comprises of linearly arranged information.

27. A document according to claim 25, wherein said functional second link visually and/or physically refers the user from the first matter to the second matter.

28. A document according to claim 27, wherein the visual reference comprises a rendered link in the hard copy reproduced document coupling the first matter with the second matter.

29. A document according to claim 28, wherein the visual reference comprises a physical alteration of the medium upon which the document is reproduced.

30. A computer readable medium having encoded thereon a linearly arranged physically reproducible document including at least one hyperlink between first matter and second matter, said link forming in said document as a user manipulable functional link that refers a user from a first portion representative of the first matter to a second portion representative of the second matter on a hard copy reproduction of said document.

31. A computer readable medium according to claim 30, wherein said medium is selected from the group consisting of a magnetic disk device, an optical disk device, a tape device and a computer network.

32. A non-linear access method for a hard copy document, said hard copy document comprising linearly arranged information and at least one link which is physically incorporated in said hard copy document and coupling first matter in said information with second matter, said method comprising the steps of:

observing a reproduction of said first matter in said information distinguishable from other of said information; and tracing a physical indicia in said hard copy document distinguishable from said information from said first matter to identify said second matter, to provide in said hard copy document a user-manipulable functional link that refers a user from a portion representative of the first matter to a portion representative of the second matter on the hard copy reproduction.

33. A method according to claim 32, wherein said physical indicia comprises a physical alteration of one of a plurality of pages of said hard copy document, and said tracing comprises using said alteration to traverse from said one page comprising said first matter to another page comprising said second matter.

34. A method according to claim 32, wherein said linearly arranged information is extracted from a non-linear source.

35. A method according to claim 32, wherein said physical indicia comprises a line printed on said hard copy document and coupling said first matter with said second matter; and said tracing comprises following said line.

36. A method according to claim 35, wherein said incorporation of said physical indicia comprises physical alteration to one of a plurality of said pages of said hard copy document.

37. A method of creating a representation of information from at least one electronically accessible source of said information, said information including at least one referential link between first matter in said information and second matter in said information, said method comprising the steps of:
    deriving said information from said source;
    identifying said at least one referential link to establish a respective referential path between the first matter and the second matter;
    arranging the information as a document in a format suitable for hard copy reproduction in which each of said first matter and said second matter are identifiable; and using said referential path to provide in said document a user-manipulable functional link that refers a user from a portion representative of the first matter to a portion representative of the second matter on the hard copy reproduction, the functional link including an observable device that refers the user from the first matter to the second matter, said device being incorporated into said format in addition to said information.

38. A method according to claim 37, wherein said device comprises at least one of:
    a rendered link coupling the two matters;
    a portion of a first display page that provides a link between the first matter on said first display page and the second matter on a second display page; and
    a portion on said second display page that provides a link between the first matter on said first display page and the second matter on the second display page.

39. A method according to claim 37, wherein said deriving includes creating said information.

40. A method according to claim 37, wherein source of said information is non-linear and said arranging includes arranging the information linearly into the document.

41. A computer program product comprising a computer readable medium incorporating a series of instructions interpretable by a computer for creating a document, said computer program product including:
    a first module for accessing electronic information intended for reproduction, the information including at least one hyperlink;
    a second module for formatting the accessed information as a contiguous localized document in a reproducible format;
    a third module for incorporating into said localized document at least one functional link related to said at least one hyperlink, said at least one functional link being reproducible in said localized document for replicating a user-manipulable function associated with said at least one hyperlink; and
    a fourth module for displaying the localized document.

42. A computer program product according to claim 41, wherein said localized document is configured for hard copy reproduction by printing and said fourth module includes instructions for controlling a printer for reproducing said localized document on a recording medium.

43. A computer program product according to claim 41, wherein said indicia are selected from the group consisting of a line printed on said medium, a symbol printed on said medium, a cut-out portion of said medium, and a tag applied to said medium.

44. A computer program product according to claim 41, wherein said third module includes instructions for converting referential links in said accessed information into physically reproducible links within said localized document.

45. A computer program product according to claim 41, wherein said first module includes instructions for accessing said information from a plurality of non-linear sources via a computer network, the sources including hyperlinks connecting one another, and said second module includes instructions for formatting said accessed information as said localized document according to predetermined hard copy reproduction criteria within which instructions of said third module are configured to create said functional links.

46. A computer program product according to claim 41, wherein said first module includes instructions for creating said information.

47. A computer program product according to claim 41, wherein said information is from a non-linear source.

48. A computer program product according to claim 41, wherein each said functional link includes indicia, reproducible in a material form to replicate, upon interpretation of said localized document said at least one hyperlink.

49. A computer program product according to claim 48, wherein said fourth module including instructions for creating said indicia with said recording medium.

50. A computer program product according to claim 48, wherein said means for displaying comprises a video display upon which said localized document incorporating said indicia can be at least viewed and said fourth module includes instructions for traversing said localised document via said indicia to functionally replicate said at least one hyperlink.

51. A computer readable medium incorporating a series of instructions interpretable by a computer for creating a document, said computer readable medium including:
    a first module for accessing electronic information intended for reproduction, the information including at least one hyperlink;
    a second module for formatting the accessed information as a contiguous localized document in a reproducible format;
    a third module for incorporating into said localized document at least one functional link related to said at least one hyperlink, said at least one functional link being reproducible in said localized document to provide in said localized document a user-manipulable functional link that refers a user from a first portion representative of the first matter to a second portion representative of the second matter on the hard copy reproduction; and
    a fourth module for displaying the localized document.

52. A computer readable medium according to claim 51, wherein said localized document is configured for hard copy reproduction by printing and said fourth module includes instructions for controlling a printer for reproducing said localized document on a recording medium.

53. A computer readable medium according to claim 51, wherein said indicia are selected from the group consisting of a line printed on said medium, a symbol printed on said medium, a cut-out portion of said medium, and a tag applied to said medium.

54. A computer readable medium according to claim 51, wherein said third module includes instructions for converting referential links in said accessed information into physically reproducible links within said localized document.

55. A computer readable medium according to claim 51, wherein said first module includes instructions for accessing said information from a plurality of non-linear sources via a computer network the sources including hyperlinks connecting one another, and said second module includes instructions for formatting said accessed information as said localized document according to predetermined hard copy reproduction criteria within which instructions of said third module are configured to create said functional links.

56. A computer readable medium according to claim 51, wherein said first module includes instructions for creating said information.

57. A computer readable medium according to claim 51, wherein the electronic information is non-linear and said formatting includes formatting the extracted information linearly into the document.

58. A computer readable medium according to claim 51, wherein each said functional link includes indicia, reproducible in a material form to replicate, upon interpretation of said localized document, said at least one hyperlink.

59. A computer readable medium according to claim 58, wherein said fourth module including instructions for creating said indicia with said recording medium.

60. A computer readable medium according to claim 58, wherein said means for displaying comprises a video display upon which said localized document incorporating said indicia can be at least viewed and said fourth module includes instructions for traversing said localised document via said indicia to functionally replicate said at least one hyperlink.

\* \* \* \* \*

UNITED STATES PATENT AND TRADEMARK OFFICE
CERTIFICATE OF CORRECTION

PATENT NO. : 6,507,410 B1
DATED : January 14, 2003
INVENTOR(S) : Philip Keith Robertson et al.

It is certified that error appears in the above-identified patent and that said Letters Patent is hereby corrected as shown below:

Title page,
Item [30], Foreign Application Priority Data, "Sep. 8, 1997 (AT)" should read -- Sep. 8, 1997 (AU) --.

Item [74], *Attorney, Agent or Firm*—"Fitzpatrick, Cella , Harper & Scinto" should read -- Fitzpatrick, Cella, Harper & Scinto --.

Drawings,
Sheet 2, FIG. 2 (#105), "document" should read -- document. --.
Sheet 8, FIG. 8A, "page" should read -- page. --.

Column 2,
Line 46, "hyperlink," should read -- hyperlink; --;
Line 50, "links" should read -- link --; and
Line 51, "links" should read -- link --.

Column 3,
Line 22, "system:" should read -- system; --;
Line 54, "embodiment," should read -- embodiment; --; and
Line 62, "invention:" should read -- invention; --.

Column 4,
Line 11, "example" should read -- example, --; and
Line 41, "form." should read -- form, --.

Column 5,
Line 37, "(paper)" should read -- (paper). --; and
Line 55, "example" should read -- example of a --.

Column 6,
Line 2, "Similarly" should read -- Similarly, --;
Line 21, "example" should read -- example, --; and
Line 33, "40." should read -- 41, --.

UNITED STATES PATENT AND TRADEMARK OFFICE
CERTIFICATE OF CORRECTION

PATENT NO. : 6,507,410 B1
DATED : January 14, 2003
INVENTOR(S) : Philip Keith Robertson et al.

It is certified that error appears in the above-identified patent and that said Letters Patent is hereby corrected as shown below:

Column 7,
Line 30, "-and" should read -- and --;
Line 38, "(110)" should read -- (I/O) --;
Line 51 , "thea" should read -- the --; and
Line 65, "etc)" should read -- etc.) --.

Column 8,
Line 10, "etc)" should read -- etc.) --; and
Line 18, "physical" should read -- and physical --.

Column 9,
Line 31, "10," should read -- 10. --.

Column 10,
Line 65, "etc" should read -- etc. --.

Column 12,
Line 5, "illustrates" should read -- illustrate --;
Line 28, "cutout-;" should read -- cutout, --; and
Line 67, "or," should read -- or --.

Column 13,
Line 9, "basis," should read -- basis. --;
Line 14, "of." should read -- of --;
Line 31, "etc" should read -- etc. --; and
Line 65, "etc" should read -- etc. --.

Column 14,
Line 10, "inks" should read -- links --; and
Line 20, "etc" should read -- etc. --.

Column 15,
Line 16, "include" should read -- include, --;
Line 28, "tation" should read -- tations --;
Line 43, "attributes" should read -- and attributes --; and
Line 58, "area," should read -- area. --.

UNITED STATES PATENT AND TRADEMARK OFFICE
CERTIFICATE OF CORRECTION

PATENT NO. : 6,507,410 B1
DATED : January 14, 2003
INVENTOR(S) : Philip Keith Robertson et al.

It is certified that error appears in the above-identified patent and that said Letters Patent is hereby corrected as shown below:

Column 16,
Line 5, "in the in" should read -- in --; and
Line 61, "FIG. 2." should read -- FIG. 2, --.

Column 17,
Line 28, "doesis" should read -- does --; and
Line 32, "of. For" should read -- of, for --.

Column 18,
Line 53, "110,—required" should read -- 110, required--; and
Line 65, "subdevice, This for example" should read -- sub-device. This, for example, --.

Column 19,
Line 7, "sub-device," should read -- sub-device. --;
Line 20, "utter-" should read -- cutter- --;
Line 54, "cutout" should read -- cut-out --; and
Line 60, "cutout" should read -- cut-out --.

Column 20,
Line 41, "pagecoordinate" should read -- page-coordinate --.

Column 21,
Line 4, "example" should read -- example, --;
Line 5, "of associated, by nesting" should read -- associated by nesting, --;
Line 14, "exits," should read -- exists --;
Line 22, "avoids" should read -- avoids a --;
Line 51, "page," should read -- page --; and
Line 52, "the," should read -- the --.

Column 22,
Line 27, "subdocument" should read -- sub-document --.

UNITED STATES PATENT AND TRADEMARK OFFICE
CERTIFICATE OF CORRECTION

PATENT NO. : 6,507,410 B1
DATED : January 14, 2003
INVENTOR(S) : Philip Keith Robertson et al.

It is certified that error appears in the above-identified patent and that said Letters Patent is hereby corrected as shown below:

Column 23,
Line 44, "reproducible" should read -- reproducible on --; and
Line 67, "imp comprises" should read -- comprises --.

Column 24,
Line 5, "claims" should read -- claim --;
Line 35, "comprises of" should read -- comprises --; and
Line 49, "user" should read -- user- --.

Signed and Sealed this

Twenty-first Day of October, 2003

JAMES E. ROGAN
*Director of the United States Patent and Trademark Office*